United States Patent
Shimezawa et al.

(10) Patent No.: US 9,641,228 B2
(45) Date of Patent: May 2, 2017

(54) BASE STATION AND TERMINAL

(75) Inventors: Kazuyuki Shimezawa, Osaka (JP); Toshizo Nogami, Osaka (JP); Kimihiko Imamura, Osaka (JP); Daiichiro Nakashima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/114,094

(22) PCT Filed: Apr. 20, 2012

(86) PCT No.: PCT/JP2012/060680
§ 371 (c)(1),
(2), (4) Date: Oct. 25, 2013

(87) PCT Pub. No.: WO2012/147638
PCT Pub. Date: Nov. 1, 2012

(65) Prior Publication Data
US 2014/0050189 A1    Feb. 20, 2014

(30) Foreign Application Priority Data
Apr. 27, 2011  (JP) ................. 2011-099259

(51) Int. Cl.
*H04W 72/12*   (2009.01)
*H04W 72/04*   (2009.01)
(Continued)

(52) U.S. Cl.
CPC ........... *H04B 7/024* (2013.01); *H04L 5/0051* (2013.01); *H04L 5/0053* (2013.01); *H04L 5/0016* (2013.01)

(58) Field of Classification Search
CPC .............. H04W 72/04; H04W 72/042; H04W 72/0406; H04W 72/1289; H04W 48/12;
(Continued)

(56) References Cited

U.S. PATENT DOCUMENTS 8,520,619 B2 *  8/2013  Hong et al. .................... 370/329
8,520,621 B2 *  8/2013  Tee et al. ....................... 370/329
(Continued)

FOREIGN PATENT DOCUMENTS

JM  2013-502175 A   1/2013
JP  2009-537083 A   10/2009
(Continued)

OTHER PUBLICATIONS

3rd Generation Partnership Project; Technical Specification Group Radio Access Network; Evolved Universal Terrestrial Radio Access (E-UTRA);Physical layer procedures (Release 10), Mar. 2011, 3GPP TS 36.212 V10.1.0 (Mar. 2011), 28 pages.
(Continued)

*Primary Examiner* — Wutchung Chu
(74) *Attorney, Agent, or Firm* — Birch, Stewart, Kolasch & Birch, LLP

(57) ABSTRACT

In a radio communication system in which a base station and a terminal communicate with each other, the base station is capable of efficiently notifying the terminal of control information. The base station sets monitoring of a second control channel in the terminal through RRC signaling that is higher-layer control information, the second control channel being transmitted using a second transmit port different from a first transmit port used for transmission of a first control channel. The base station transmits control information for the terminal by mapping the control information to the second control channel. The first transmit port is a transmit port used for transmission of a cell-specific reference signal that is a reference signal common within a cell, and the second transmit port is a transmit port used for transmission of a terminal-specific reference signal that is a reference signal specific to the terminal.

12 Claims, 11 Drawing Sheets

(51) Int. Cl.
*H04B 7/024* (2017.01)
*H04L 5/00* (2006.01)

(58) Field of Classification Search
CPC .... H04W 72/00; H04L 5/0053; H04L 5/0094; H04L 5/0032; H04L 5/0048; H04L 5/0007; H04L 5/0051; H04L 1/1861; H04L 27/2613; H04L 5/0044
USPC .............. 370/329, 252, 328; 455/450, 452.1
See application file for complete search history.

(56) References Cited

U.S. PATENT DOCUMENTS

| | | | |
|---|---|---|---|
| 8,559,354 B2 | 10/2013 | Kwon et al. | |
| 8,942,196 B2 | 1/2015 | Kwon et al. | |
| 9,025,551 B2* | 5/2015 | Kim | H04W 76/045 370/329 |
| 9,295,038 B2 | 3/2016 | Hoymann et al. | |
| 2009/0262699 A1 | 10/2009 | Wemgerter et al. | |
| 2009/0323957 A1* | 12/2009 | Luo | H04J 11/0069 380/270 |
| 2010/0075679 A1 | 3/2010 | Tenny et al. | |
| 2010/0135242 A1* | 6/2010 | Nam et al. | H04L 5/0007 370/330 |
| 2010/0165847 A1 | 7/2010 | Kamuf et al. | |
| 2010/0227569 A1 | 9/2010 | Bala et al. | |
| 2011/0038310 A1* | 2/2011 | Chmiel | H04J 11/0069 370/328 |
| 2011/0044391 A1* | 2/2011 | Ji et al. | 375/260 |
| 2011/0075624 A1* | 3/2011 | Papasakellariou et al. | 370/329 |
| 2011/0085503 A1* | 4/2011 | Nam | H04W 72/042 370/329 |
| 2011/0103250 A1* | 5/2011 | Li | H04W 76/046 370/252 |
| 2011/0170496 A1* | 7/2011 | Fong et al. | 370/329 |
| 2011/0188587 A1* | 8/2011 | Zhang et al. | 375/260 |
| 2011/0194483 A1 | 8/2011 | Ji et al. | |
| 2012/0008586 A1 | 1/2012 | Kwon et al. | |
| 2012/0176884 A1* | 7/2012 | Zhang | H04B 7/024 370/203 |
| 2012/0250523 A1 | 10/2012 | Miki | |
| 2012/0281566 A1 | 11/2012 | Pelletier et al. | |
| 2012/0281667 A1* | 11/2012 | Chang et al. | 370/329 |
| 2013/0039284 A1* | 2/2013 | Marinier | H04L 5/001 370/329 |
| 2013/0230015 A1 | 9/2013 | Hoymann et al. | |
| 2013/0242853 A1* | 9/2013 | Seo | H04L 5/0023 370/315 |
| 2014/0016596 A1* | 1/2014 | Kim et al. | 370/329 |

FOREIGN PATENT DOCUMENTS

| | | |
|---|---|---|
| JP | 2011-82707 A | 4/2011 |
| TW | 201019753 A1 | 5/2010 |
| TW | 201110769 A1 | 3/2011 |
| WO | WO 2010/053984 A2 | 5/2010 |
| WO | WO 2010/053984 A3 | 8/2010 |
| WO | WO 2010/117225 A2 | 10/2010 |
| WO | WO 2011/019973 A2 | 2/2011 |
| WO | WO 2011/085189 A1 | 7/2011 |

OTHER PUBLICATIONS

3rd Generation Partnership Project; Technical Specification Group Radio Access Network; Further Advancements for E-UTRA Physical Layer Aspects (Release 9), Mar. 2010, 3GPP TR 36.814 V9.0.0. (Mar. 2010), 104 pages.

Ericsson, ST-Ericsson, "Aspects on Distributed RRUs with Shared Cell-ID for Heterogeneous Deployments", 3GPP TSG-RAN WG1 #64, R1-110649, Taipei, Taiwan, Feb. 21-25, 2011, 11 pages.

Nokia Siemens Networks et al., "Considerations on Initialization and Mapping of DM-RS Sequence", 3GPP TSG RAN WG1#58 Meeting, Agenda Item: 15.1, Shenzhen, China, Aug. 24-28, 2009, 4 pages, R1-093304.

Nokia Siemens Networks et al., "Summary of e-mail discussion on Number of bits assumed reserved for DM-RS in R-PDCCH", 3GPP TSG RAN WG1 Meeting #64, Agenda Item: 6.2.5, Taipei, Taiwan, Feb. 21-25, 2011, 4 pages, R1-111027.

TSG RAN WG5 (Testing), "RAN5 agreed non TTCN CR(s) under WI Conformance Test Aspects-Enhanced Dual-layer transmission . . . ", 3GPP TSG RAN Meeting #51, Agenda Item: 10.7, Kansas City, USA, Mar. 15-18, 2011, pp. 2-37, RP-110176 (Change Request for R5-110990).

Motorola, "Backhaul Control Channel Design", 3GPP TSG RAN WG1 Meeting #61, R1-103173, Montreal, Canada, May 10-14, 2010, 4 Pages.

NTT Docomo, "Comp With Lower TX Power RRH in Heterogeneous Network", 3GPP TSG-RAN WG1 #64, R1-110867, Taipei, Taiwan, Feb. 21-25, 2011, 8 Pages.

U.S. Appl. No. 14/114,143, Advisory Action mailed Apr. 4, 2016.
U.S. Appl. No. 14/114,143, Office Action mailed Apr. 22, 2015.
U.S. Appl. No. 14/114,143, Office Action mailed Jul. 18, 2016.
U.S. Appl. No. 14/114,143, Office Action mailed Oct. 22, 2015.
Hoymann et al., U.S. Appl. No. 61/414,254, filed Nov. 16, 2010.
U.S. Office Action for U.S. Appl. No. 14/114,143 dated Feb. 17, 2017.

\* cited by examiner

BASE STATION AND TERMINAL

TECHNICAL FIELD

The present invention relates to a base station, a terminal, a communication system, a communication method, and an integrated circuit.

BACKGROUND ART

In radio communication systems such as 3GPP (Third Generation Partnership Project) WCDMA (Wideband Code Division Multiple Access), LTE (Long Term Evolution), and LTE-A (LTE-Advanced), and IEEE (The Institute of Electrical and Electronics engineers) Wireless LAN and WiMAX (Worldwide Interoperability for Microwave Access) communication systems, a base station (cell, transmit station, transmitter, eNodeB) and a terminal (mobile terminal, receive station, mobile station, receiver, UE (User Equipment)) each include a plurality of transmit/receive antennas, and employ MIMO (Multi Input Multi Output) technology to spatially multiplex data signals to realize high-speed data communication.

In these radio communication systems, in order to realize data communication between a base station and a terminal, it is necessary for the base station to perform various kinds of control for the terminal. To do this, the base station notifies the terminal of control information by using certain resources to perform data communication in the downlink and uplink. For example, the base station notifies the terminal of information on the allocation of resources, information on the modulation and coding of data signals, number-of-spatial-multiplexing-layers information on data signals, transmit power control information, and so forth to implement data signals. Transmission of such control information is realized using the method described in NPL 1.

Communication methods based on MIMO technology in the downlink are implemented using various methods such as a multi-user MIMO scheme in which the same resources are allocated to different terminals, and a CoMP (Cooperative Multipoint) scheme in which a plurality of base stations coordinate with each other to perform data communication.

FIG. 14 is a diagram illustrating an example in which the multi-user MIMO scheme is implemented. In FIG. 14, a base station 1401 performs data communication with a terminal 1402 via a downlink 1404, and performs data communication with a terminal 1403 via a downlink 1405. In this case, the terminal 1402 and the terminal 1403 perform multi-user MIMO-based data communication. The downlink 1404 and the downlink 1405 use the same resources in the frequency direction and the time direction. Further, the downlink 1404 and the downlink 1405 each control beams using a precoding technique and so forth to mutually maintain orthogonality or reduce co-channel interference. Accordingly, the base station 1401 can realize data communication with the terminal 1402 and the terminal 1403 using the same resources.

FIG. 15 is a diagram illustrating an example in which the CoMP scheme is implemented. In FIG. 15, the establishment of a radio communication system having a heterogeneous network configuration using a macro base station 1501 with a broad coverage and a RRH (Remote Radio Head) 1502 with a narrower coverage than this macro base station is illustrated. Now, consideration is given of the case where the coverage of the macro base station 1501 includes part or all of the coverage of the RRH 1502. In the example illustrated in FIG. 15, the macro base station 1501 and the RRH 1502 establish a heterogeneous network configuration, and coordinate with each other to perform data communication with a terminal 1504 via a downlink 1505 and a downlink 1506, respectively. The macro base station 1501 is connected to the RRH 1502 via a line 1503, and can transmit and receive a control signal and/or a data signal to and from the RRH 1502. The line 1503 may be implemented using a wired line such as a fiber optic line or a wireless line that is based on relay technology. In this case, the macro base station 1501 and the RRH 1502 use frequencies (resources) some or all of which are identical, thereby improving the total frequency utilization efficiency (transmission capacity) within a coverage area established by the macro base station 1501.

The terminal 1504 can perform single-cell communication with the macro base station 1501 or the RRH 1502 while located near the macro base station 1501 or the RRH 1502. While located near the edge (cell edge) of the coverage established by the RRH 1502, the terminal 1504 needs to take measures against co-channel interference from the macro base station 1501. There has been proposed a method for reducing or suppressing interference with the terminal 1504 in the cell-edge area by using the CoMP scheme in which neighboring base stations coordinate with each other for multi-cell communication (cooperative communication) between the macro base station 1501 and the RRH 1502. As the CoMP scheme, for example, the method described in NPL 2 has been proposed.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 10), March 2011, 3GPP TS 36.212 V10.1.0 (2011-03).

NPL 2: 3rd Generation Partnership Project; Technical Specification Group Radio Access Network; Further Advancements for E-UTRA Physical Layer Aspects (Release 9), March 2010, 3GPP TR 36.814 V9.0.0 (2010-03).

SUMMARY OF INVENTION

Technical Problem

In a radio communication system capable of MIMO communication based on a scheme such as the multi-user MIMO scheme or the CoMP scheme, however, due to the improvement in transmission capacity achievable with one base station, the number of terminals that can be accommodated also increases. For this reason, in a case where a base station notifies terminals of control information using conventional resources, resources allocated to the control information may be insufficient. In this case, it is difficult for the base station to efficiently allocate data to terminals, which may hinder the improvement of transmission efficiency.

The present invention has been made in view of the foregoing problems, and it is an object of the present invention to provide a base station, a terminal, a communication system, a communication method, and an integrated circuit that allow the base station to efficiently notify the terminal of control information in a radio communication system in which the base station and the terminal communicate with each other.

Solution to Problem (1) According to an aspect of the present invention, a base station forms a cell, and communicates with a terminal. The base station sets monitoring of a second control channel in the terminal through RRC signaling that is higher-layer control information, the second control channel being transmitted using a second transmit port different from a first transmit port used for transmission of a first control channel. The base station transmits control information for the terminal by mapping the control information to the second control channel. The first transmit port is a transmit port used for transmission of a cell-specific reference signal that is a reference signal common within the cell, and the second transmit port is a transmit port used for transmission of a terminal-specific reference signal that is a reference signal specific to the terminal.

(2) Preferably, the terminal-specific reference signal is generated based on an orthogonal code corresponding to the second transmit port and a scrambling code designated for the terminal through the RRC signaling.

(3) Preferably, the second control channel is transmitted using the second transmit port, which is defined in advance.

(4) Preferably, the second control channel is transmitted using the second transmit port, which is designated through the RRC signaling.

(5) Preferably, in a case where the base station does not set monitoring of the second control channel in the terminal through the RRC signaling, the base station transmits the control information for the terminal by mapping the control information to the first control channel. In a case where the base station sets monitoring of the second control channel in the terminal through the RRC signaling, the base station transmits the control information for the terminal by mapping the control information to the first control channel or the second control channel.

(6) Preferably, in a case where the base station does not set monitoring of the second control channel in the terminal through the RRC signaling, the base station transmits the control information for the terminal by mapping the control information to the first control channel. In a case where the base station sets monitoring of the second control channel in the terminal through the RRC signaling, the base station transmits the control information for the terminal by mapping the control information to the second control channel.

(7) According to another aspect of the present invention, a terminal communicates with a base station forming a cell. Monitoring of a second control channel that is transmitted using a second transmit port different from a first transmit port used for transmission of a first control channel is set by the base station through RRC signaling that is higher-layer control information. The terminal searches for the second control channel, to which control information for the terminal is mapped. The first transmit port is a transmit port used for transmission of a cell-specific reference signal that is a reference signal common within the cell, and the second transmit port is a transmit port used for transmission of a terminal-specific reference signal that is a reference signal specific to the terminal.

(8) Preferably, the terminal-specific reference signal is generated based on an orthogonal code corresponding to the second transmit port, and a scrambling code designated for the terminal through the RRC signaling.

(9) Preferably, the second control channel is transmitted using the second transmit port, which is defined in advance.

(10) Preferably, the second control channel is transmitted using the second transmit port, which is designated through the RRC signaling.

(11) Preferably, in a case where the terminal is not set with monitoring of the second control channel by the base station through the RRC signaling, the terminal searches for the first control channel, to which the control information for the terminal is mapped. In a case where the terminal is set with monitoring of the second control channel by the base station through the RRC signaling, the terminal searches for the first control channel and the second control channel, to which the control information for the terminal is mapped.

(12) Preferably, in a case where the terminal is not set with monitoring of the second control channel by the base station through the RRC signaling, the terminal searches for the first control channel, to which the control information for the terminal is mapped. In a case where the terminal is set with monitoring of the second control channel by the base station through the RRC signaling, the terminal searches for the second control channel, to which the control information for the terminal is mapped.

(13) According to still another aspect of the present invention, in a communication system, a base station forming a cell and a terminal communicate with each other. The base station sets monitoring of a second control channel in the terminal through RRC signaling that is higher-layer control information, the second control channel being transmitted using a second transmit port different from a first transmit port used for transmission of a first control channel. The base station transmits control information for the terminal by mapping the control information to the second control channel. The terminal is set with monitoring of the second control channel by the base station through the RRC signaling. The terminal searches for the second control channel. The first transmit port is a transmit port used for transmission of a cell-specific reference signal that is a reference signal common within the cell, and the second transmit port is a transmit port used for transmission of a terminal-specific reference signal that is a reference signal specific to the terminal.

(14) According to still another aspect of the present invention, a communication method is executed by a base station that forms a cell and that communicates with a terminal. The communication method includes a step of setting monitoring of a second control channel in the terminal through RRC signaling that is higher-layer control information, the second control channel being transmitted using a second transmit port different from a first transmit port used for transmission of a first control channel; and a step of transmitting control information for the terminal by mapping the control information to the second control channel. The first transmit port is a transmit port used for transmission of a cell-specific reference signal that is a reference signal common within the cell, and the second transmit port is a transmit port used for transmission of a terminal-specific reference signal that is a reference signal specific to the terminal.

(15) According to still another aspect of the present invention, a communication method is executed by a terminal that communicates with a base station forming a cell. The communication method includes a step of being set with monitoring of a second control channel by the base station through RRC signaling that is higher-layer control information, the second control channel being transmitted using a second transmit port different from a first transmit port used for transmission of a first control channel; and a step of searching for the second control channel, to which control information for the terminal is mapped. The first transmit port is a transmit port used for transmission of a cell-specific reference signal that is a reference signal common within the cell, and the second transmit port is a transmit port used for transmission of a terminal-specific reference signal that is a reference signal specific to the terminal.

(16) According to still another aspect of the present invention, an integrated circuit is implemented by a base station that forms a cell and that communicates with a terminal. The integrated circuit includes a function of setting monitoring of a second control channel in the terminal through RRC signaling that is higher-layer control information, the second control channel being transmitted using a second transmit port different from a first transmit port used for transmission of a first control channel; and a function of transmitting control information for the terminal by mapping the control information to the second control channel. The first transmit port is a transmit port used for transmission of a cell-specific reference signal that is a reference signal common within the cell, and the second transmit port is a transmit port used for transmission of a terminal-specific reference signal that is a reference signal specific to the terminal.

(17) According to still another aspect of the present invention, an integrated circuit is implemented by a terminal that communicates with a base station forming a cell. The integrated circuit includes a function of being set with monitoring of a second control channel by the base station through RRC signaling that is higher-layer control information, the second control channel being transmitted using a second transmit port different from a first transmit port used for transmission of a first control channel; and a function of searching for the second control channel, to which control information for the terminal is mapped. The first transmit port is a transmit port used for transmission of a cell-specific reference signal that is a reference signal common within the cell, and the second transmit port is a transmit port used for transmission of a terminal-specific reference signal that is a reference signal specific to the terminal.

Advantageous Effects of Invention

According to this invention, in a radio communication system in which a base station and a terminal communicate with each other, the base station can efficiently notify the terminal of control information.

DESCRIPTION OF EMBODIMENTS

First Embodiment

A first embodiment of the present invention will be described hereinafter. A communication system according to this first embodiment includes a base station (transmitter, cell, transmission point, set of transmit antennas, set of transmit antenna ports, component carrier, eNodeB) and a terminal (terminal device, mobile terminal, reception point, receiving terminal, receiver, set of receive antennas, set of receive antenna ports, UE).

Figure 1:
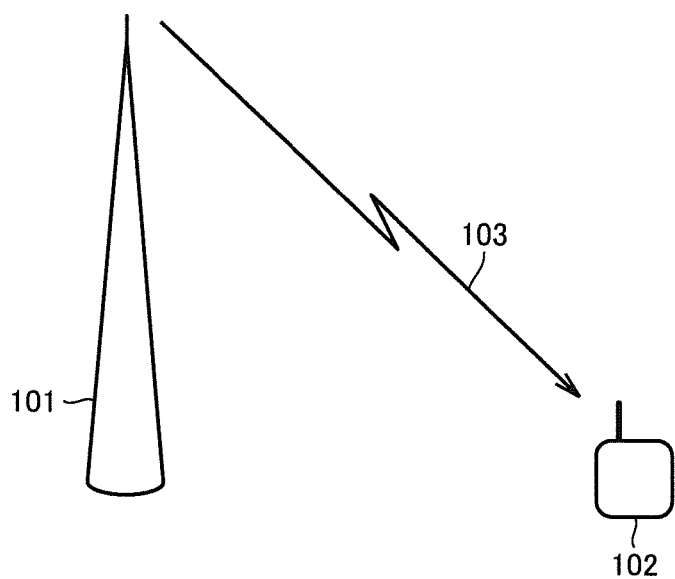
FIG. 1 is a schematic diagram illustrating a communication system for performing data transmission according to a first embodiment of the present invention.

FIG. 1 is a schematic diagram illustrating a communication system for performing data transmission according to the first embodiment of the present invention. In FIG. 1, a base station 101 transmits control information and information data to a terminal 102 via a downlink 103 in order to perform data communication with the terminal 102.

The control information is subjected to an error detection coding process and so forth, and is then mapped to a control channel. The control channel subjected to an error correction coding process and a modulation process is transmitted and received via a first control channel (first physical control channel) region or a second control channel (second physical control channel) region different from the first control channel region. The term physical control channel, as used herein, is a kind of physical channel and refers to a control channel defined in a physical frame.

In terms of a point of view, the first control channel is a physical control channel that uses the same transmit port (antenna port) as that for a cell-specific reference signal. The second control channel is a physical control channel that uses the same transmit port as that for a terminal-specific reference signal. The terminal 102 demodulates the first control channel using the cell-specific reference signal, and demodulates the second control channel using the terminal-specific reference signal. The cell-specific reference signal is a reference signal common to all the terminals within a cell, and is a reference signal usable by any terminal because it is included in substantially all the resources. Accordingly, the first control channel can be demodulated by any terminal. In contrast, the terminal-specific reference signal is a reference signal that is included only in an allocated resource, and can be subjected to an adaptive beamforming process in a manner similar to that for data. Accordingly, adaptive beamforming gains can be obtained on the second control channel.

In terms of a different point of view, the control channel (first control channel) to be mapped to the first control channel region is a physical control channel over OFDM symbols (symbols) located in a front part of a physical sub-frame, and may be arranged over an entire system bandwidth (component carrier (CC)) in these OFDM symbols. The control channel (second control channel) to be mapped to the second control channel region is a physical control channel over OFDM symbols located after the first control channel in the physical sub-frame, and may be arranged in part of the system bandwidth over these OFDM symbols. Since the first control channel is arranged over OFDM symbols dedicated to a control channel which are located in a front part of a physical sub-frame, the terminal 102 can receive and demodulate the first control channel prior to rear OFDM symbols used for a physical data channel. The first control channel can also be received by a terminal that monitors only OFDM symbols dedicated to a control channel. Since the first control channel can be spread out over an entire CC, it is possible to randomize inter-cell interference. Furthermore, the first control channel region is a region set specific to the base station 101, and is a region common to all the terminals connected to the base station 101. In contrast, the second control channel is arranged over rear OFDM symbols used for a shared channel (physical data channel) which terminals under communication normally receive. In addition, frequency division multiplexing allows second control channels or a second control channel and a physical data channel to be orthogonally multiplexed (multiplexed without interference). Furthermore, the second control channel region is a region set specific to the terminal 102, and is a region set for each of the terminals connected to the base station 101. The first control channel region and the second control channel region are arranged in the same physical sub-frame. An OFDM symbol is the unit of mapping the bits of each channel in the time direction.

In terms of a still different point of view, the first control channel is a cell-specific physical control channel, and is a physical channel which both a terminal in the idle state and a terminal in the connected state can acquire. The second control channel is a terminal-specific physical control channel, and is a physical channel which only a terminal in the connected state can acquire. The term idle state refers to a state where data is not immediately transmitted or received, such as a state where a base station does not accumulate RRC (Radio Resource Control) information (RRC_IDLE state) or a state where a mobile station is performing discontinuous reception (DRX). The term connected state, in contrast, refers to a state where data is ready to be immediately transmitted or received, such as a state where a terminal holds network information (RRC_CONNECTED state) or a state where a mobile station is not performing discontinuous reception (DRX). The first control channel is a channel which a terminal can receive without depending on terminal-specific RRC signaling. The second control channel is a channel set using terminal-specific RRC signaling, and is a channel which a terminal can receive using terminal-specific RRC signaling. That is, the first control channel is a channel which any terminal can receive with pre-limited settings, and the second control channel is a channel for which terminal-specific settings can be easily changed.

Figure 2:
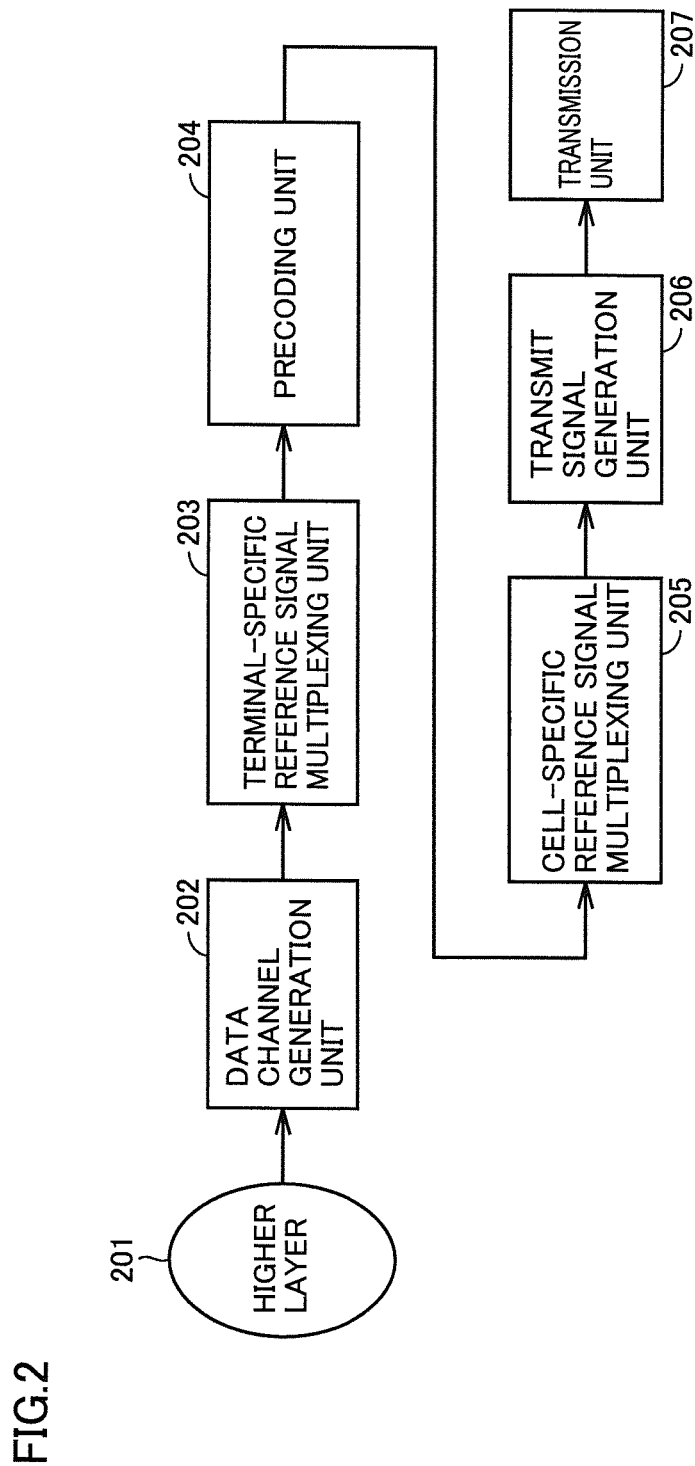
FIG. 2 is a schematic block diagram illustrating a configuration of a base station 101 according to the first embodiment of the present invention.

FIG. 2 is a schematic block diagram illustrating a configuration of the base station 101 according to the first embodiment of the present invention. In FIG. 2, the base station 101 includes a higher layer 201, a data channel generation unit 202, a terminal-specific reference signal multiplexing unit 203, a precoding unit 204, a cell-specific reference signal multiplexing unit 205, a transmit signal generation unit 206, and a transmission unit 207.

The higher layer 201 generates information data for the terminal 102, and outputs the generated information data to the data channel generation unit 202.

The data channel generation unit (shared channel generation unit) 202 performs adaptive control on the information data output from the higher layer 201 to generate a data channel (shared channel) for the terminal 102. Specifically, the data channel generation unit 202 performs processes such as a coding process for performing error correction coding, a scrambling process for applying a specific scrambling code to the terminal 102, a modulation process for using a multi-level modulation scheme and so forth, and a layer mapping process for performing spatial multiplexing such as MIMO.

The terminal-specific reference signal multiplexing unit 203 generates terminal-specific reference signals specific to the terminal 102 (data channel demodulation reference signal, terminal-specific control channel demodulation reference signal, DM-RS (Demodulation Reference Signal), DRS (Dedicated Reference Signal), Precoded RS, user-specific reference signal, UE-specific RS), and multiplexes the terminal-specific reference signals to the data channel generated by the data channel generation unit 202.

The precoding unit 204 performs a precoding process specific to the terminal 102 on the data channel and terminal-specific reference signals output from the terminal-specific reference signal multiplexing unit 203. In the precoding process, preferably, phase rotation and so forth are performed on a signal to be generated so as to allow the terminal 102 to efficiently receive the signal (for example, maximize the receive power, reduce interference from neighboring cells, or reduce interference with neighboring cells). In addition, processes that can be used include, but not limited to, processes based on predetermined precoding matrices, CDD (Cyclic Delay Diversity), and transmit diversity (such as SFBC (Spatial Frequency Block Code), STBC (Spatial Time Block Code), TSTD (Time Switched Transmission Diversity), and FSTD (Frequency Switched Transmission Diversity))). In a case where a plurality of separate types of PMIS are fed back, the precoding unit 204 performs computation such as multiplication on the plurality of PMIS and can perform precoding.

The terminal-specific reference signals are implemented using signals which are known by both the base station 101 and the terminal 102. The data channel and the terminal-specific reference signals are subjected to a precoding process specific to the terminal 102 by the preceding unit 204. Accordingly, when demodulating the data channel, the terminal 102 can estimate the channel state in the downlink 103 and a channel for equalizing precoding weights used by the preceding unit 204, by using the terminal-specific reference signals. That is, the base station 101 can demodulate the signals which have been subjected to the preceding process, without the need to notify the terminal 102 of the preceding weights used by the preceding unit 204. In a case where a control channel is to be mapped to the second control channel region, the control channel is subjected to the preceding process by the base station 101 in a manner similar to that for the data channel. In addition, the control channel is subjected to channel state estimation using the terminal-specific reference signals, and is subjected to a demodulation process by the terminal 102 in a manner similar to that for the data channel.

The cell-specific reference signal multiplexing unit 205 generates cell-specific reference signals that are known by both the base station 101 and the terminal 102 (channel state measurement reference signal, CRS (Common RS), Cell-specific RS, Non-precoded RS, cell-specific control channel demodulation reference signal) to measure the channel state of the downlink 103 between the base station 101 and the terminal 102. The generated cell-specific reference signals are multiplexed to the data channel and terminal-specific reference signals subjected to the precoding process by the precoding unit 204.

The cell-specific reference signals may be any signal (sequence) as long as they are signals that are known by both the base station 101 and the terminal 102. The cell-specific reference signals may be implemented using, for example, a random number and a pseudo-noise sequence based on a pre-assigned parameter such as a number (cell ID) specific to the base station 101. A method for performing orthogonalization between antenna ports, such as a method for setting a resource element to which a channel state measurement reference signal is mapped to null (zero) between the antenna ports, a method for performing code division multiplexing using a pseudo-noise sequence, or a combination thereof, may be used. The channel state measurement reference signal may not necessarily be multiplexed to all the sub-frames, but may be multiplexed to only some sub-frames.

The cell-specific reference signals are reference signals to be multiplexed after the precoding process has been performed by the precoding unit 204. Thus, the terminal 102 can measure the channel state of the downlink 103 between the base station 101 and the terminal 102 using the cell-specific reference signals, and can demodulate a signal that has not yet been subjected to the precoding process by the precoding unit 204.

The transmit signal generation unit 206 maps the signals output from the cell-specific reference signal multiplexing unit 205 to the respective resource elements of the antenna ports. Specifically, the transmit signal generation unit 206 maps the data channel to a shared channel (PDSCH; Physical Downlink Shared Channel) region described below, and maps the control channel to be transmitted through the second control channel region to the second control channel region. Further, when mapping a control channel to a first control channel (PDCCH; Physical Downlink Control Channel) region described below, the transmit signal generation unit 206 multiplexes the control channel to the signals output from the cell-specific reference signal multiplexing unit 205. Here, the base station 101 can map control channels addressed to a plurality of terminals to the first control channel region or the second control channel region.

The transmission unit 207 performs processes, such as inverse fast Fourier transform (IFFT), the addition of guard interval, and conversion into radio frequencies, on the signals output from the transmit signal generation unit 206, and then transmits the resulting signals from transmit antennas, where the number of transmit antennas (the number of transmit antenna ports) is at least one.

Figure 3:
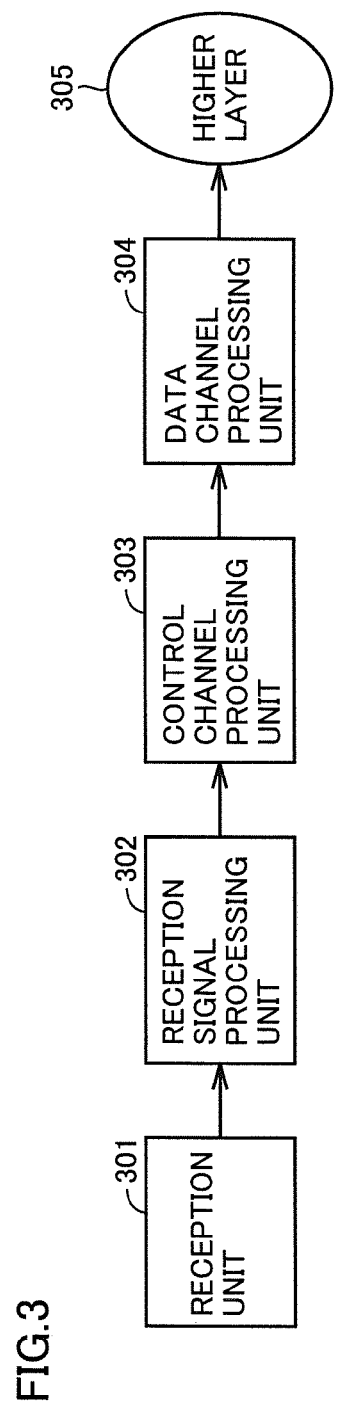
FIG. 3 is a schematic block diagram illustrating a configuration of a terminal 102 according to the first embodiment of the present invention.

FIG. 3 is a schematic block diagram illustrating a configuration of the terminal 102 according to the first embodiment of the present invention. In FIG. 3, the terminal 102 includes a reception unit 301, a reception signal processing unit 302, a control channel processing unit 303, a data channel processing unit 304, and a higher layer 305.

The reception unit 301 receives signals transmitted from the base station 101 using receive antennas, where the number of receive antennas (the number of receive antenna ports) is at least one. The reception unit 301 performs a process for conversion from radio frequencies to baseband signals, the removal of the added guard interval, and a time-frequency conversion process based on fast Fourier transform (FFT) or the like on the received signals.

The reception signal processing unit 302 de-maps (separates) the signals mapped by the base station 101. Specifically, the reception signal processing unit 302 de-maps the first control channel or second control channel mapped to the first control channel region and/or the second control channel region, and the data channel mapped to the data channel region.

The control channel processing unit 303 searches for and detects a control channel mapped to the first control channel region or the second control channel region and addressed to the terminal 102. The control channel processing unit 303 sets the first control channel region or the second control channel region as a control channel region in which the control channel is searched for. The method for setting the control channel region is determined by whether the base station 101 sets the second control channel for the terminal 102 through terminal-specific setting (configuration) information on (for) the second control channel, which is higher-layer control information (for example, RRC (Radio Resource Control) signaling) of which the terminal 102 is notified.

That is, in a case where the base station 101 notifies the terminal 102 of the terminal-specific setting information on the second control channel and thus sets (configures) the second control channel, the terminal 102 searches for and detects the control channel mapped to the second control channel and addressed to the terminal 102. In a case where the base station 101 does not notify the terminal 102 of the terminal-specific setting information on the second control channel or does not set the second control channel, the terminal 102 searches (monitors) for and detects the control channel mapped to the first control channel and addressed to the terminal 102.

The control channel processing unit 303 uses the terminal-specific reference signals for the demodulation of the control channel mapped to the second control channel region and addressed to the terminal 102. The control channel processing unit 303 uses the cell-specific reference signals for the demodulation of the control channel mapped to the first control channel region and addressed to the terminal 102.

Further, the control channel processing unit 303 searches for and identifies the control channel addressed to the terminal 102 in the set (configured) control channel region. Specifically, the control channel processing unit 303 sequentially searches all or some of the control channel candidates obtained in accordance with the type of control information, the position of the resource to be mapped, the size of the resource to be mapped, and so forth, by performing a demodulation and decoding process. The control channel processing unit 303 determines whether control information is the control information addressed to the terminal 102, by using error detection codes (for example, CRC (Cyclic Redundancy Check) codes) added to the control information. This search method is also called blind decoding.

The reception signal processing unit 302 identifies the detected control channel. As a result of the identification, if the de-mapped data channel includes the data channel addressed to the terminal 102, the reception signal processing unit 302 outputs the data channel to the data channel processing unit 304. A control information signal is shared by the entire terminal 102 (also including the higher layer), and used for various kinds of control to be performed by the terminal 102, such as the demodulation of the data channel.

The data channel processing unit 304 performs processes, such as a channel estimation process, a channel compensation process (filtering process), a layer de-mapping process, a demodulation process, a descrambling process, and a decoding process, on the input data channel, and outputs the result to the higher layer 305. In the channel estimation process, the data channel processing unit 304 estimates (channel estimation) amplitude and phase variations (frequency response, transfer function) in each resource element for each layer (rank, spatial multiplexing) in accordance with the terminal-specific reference signals multiplexed to the input data channel to determine channel estimates. For a resource element to which no terminal-specific reference signals are mapped, the data channel processing unit 304 performs channel estimation using interpolation in the frequency direction and the time direction based on a resource element to which a terminal-specific reference signal is mapped. In the channel compensation process, the data channel processing unit 304 performs channel compensation on the input data channel using the estimated channel estimates to detect (recover) the data channel for each layer. As the detection method, the data channel processing unit 304 can use ZF (Zero Forcing)-based or MMSE (Minimum Mean Square Error)-based equalization, removal of interference, or the like. In the layer de-mapping process, the data channel processing unit 304 performs a de-mapping process on signals for individual layers to obtain the respective codewords. Subsequently, the data channel processing unit 304 performs the process on a codeword-by-codeword basis. In the demodulation process, the data channel processing unit 304 performs demodulation based on the modulation scheme used. In the descrambling process, the data channel processing unit 304 performs descrambling based on the scrambling codes used. In the decoding process, the data channel processing unit 304 performs an error correction decoding process based on the coding method applied.

Figure 4:
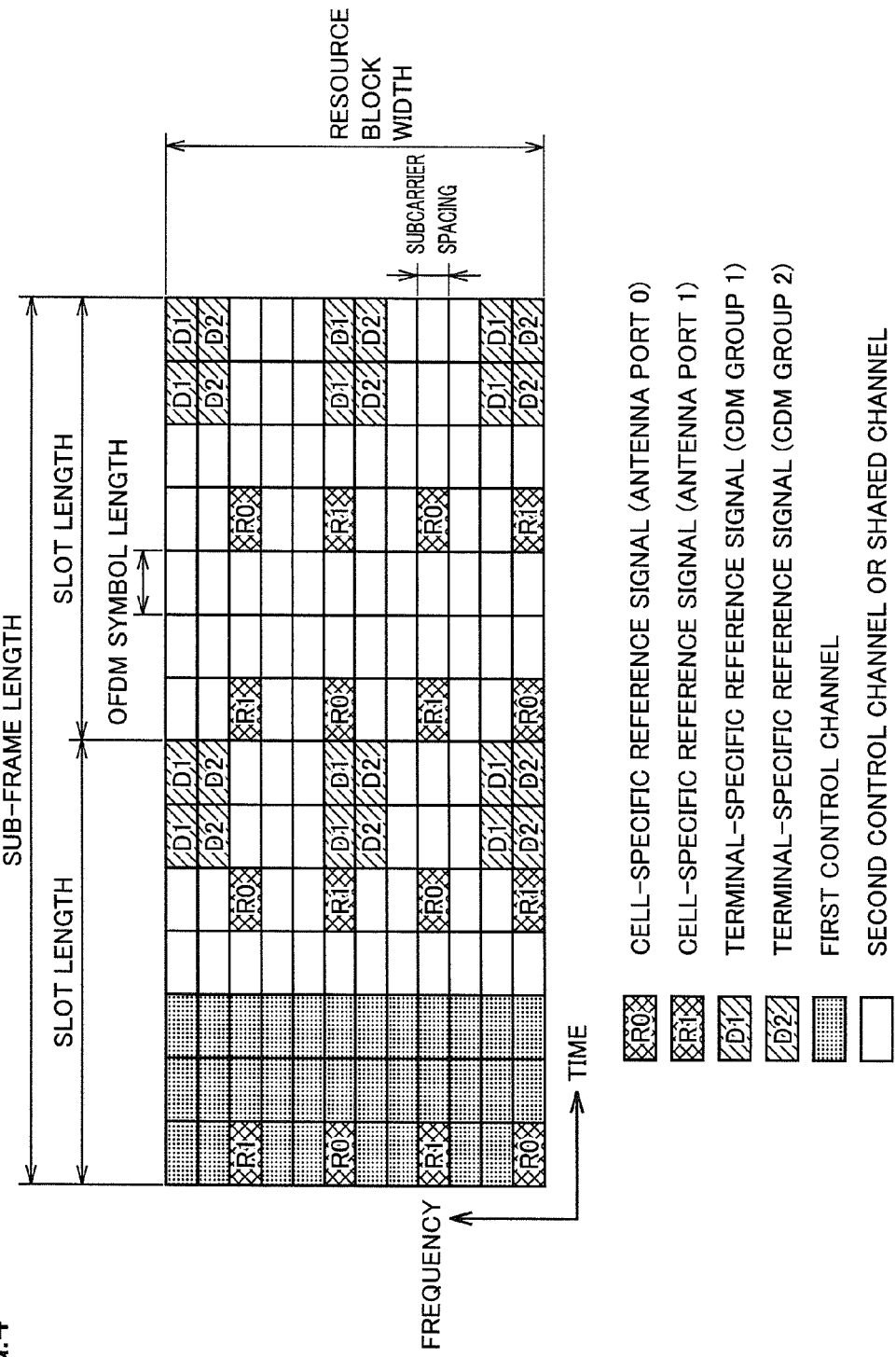
FIG. 4 is a diagram illustrating an example of one resource block pair that the base station 101 maps.

FIG. 4 is a diagram illustrating an example of one resource block pair that the base station 101 maps. FIG. 4 illustrates two resource blocks (RBs; Resource Blocks, a resource block pair). Each resource block is composed of twelve subcarriers in the frequency direction, and seven OFDM symbols in the time direction. Each subcarrier for a duration of one OFDM symbol is called a resource element. The resource block pairs are arranged in the frequency direction, and the number of resource block pairs can be set for each base station. For example, the number of resource block pairs can be set to 6 to 110. The width of the resource block pairs in the frequency direction is called a system bandwidth. A resource block pair in the time direction is called a sub-frame. In each sub-frame, consecutive sets of seven OFDM symbols in the time direction are each also called a slot. In the following description, resource block pairs are also referred to simply as resource blocks.

Among the resource elements shown shaded, R0 to R1 represent cell-specific reference signals for antenna ports 0 to 1, respectively. The cell-specific reference signals illustrated in FIG. 4 are used in the case of two antenna ports, the number of which can be changed. For example, cell-specific reference signals for one antenna port or four antenna ports can be mapped. Cell-specific reference signals can be set for up to four antenna ports (antenna ports 0 to 3).

Among the resource elements shown shaded, D1 to D2 represent terminal-specific reference signals in CDM (Code Division Multiplexing) group 1 to CDM group 2, respectively. The terminal-specific reference signals in CDM group 1 and CDM group 2 are each subjected to CDM using orthogonal codes such as Walsh codes. The terminal-specific reference signals in CDM group 1 and CDM group 2 are further mutually subjected to FDM (Frequency Division Multiplexing). The terminal-specific reference signals can be mapped to up to rank 8 using eight antenna ports (antenna ports 7 to 14) in accordance with the control channel or data channel to be mapped to the resource block pair. In addition, the terminal-specific reference signals are configured such that the spreading code length for CDM or the number of resource elements to be mapped can be changed in accordance with the rank for mapping.

For example, the terminal-specific reference signals for ranks 1 to 2 are formed of spreading codes of 2-chip length for antenna ports 7 to 8, and are mapped to CDM group 1. The terminal-specific reference signals for ranks 3 to 4 are formed of spreading codes of 2-chip length for antenna ports 7 to 10, and are mapped to CDM group 1 (antenna ports 7 to 8) and CDM group 2 (antenna ports 9 to 10). The terminal-specific reference signals for ranks 5 to 8 are formed of spreading codes of 4-chip length for antenna ports 7 to 14, and are mapped to CDM group 1 and CDM group 2.

In the terminal-specific reference signals, a scrambling code is further superimposed on an orthogonal code on each antenna port. The scrambling code is generated based on the cell ID and the scrambling ID which are sent from the base station 101. For example, a scrambling code is generated from a pseudo-noise sequence generated based on the cell ID and the scrambling ID which are sent from the base station 101. The scrambling ID is, for example, a value representing 0 or 1. The scrambling IDs and antenna ports to be used can also be subjected to joint coding, and information indicating them can also be formed into an index.

Among the resource elements shown shaded, the area composed of the top first to third OFDM symbols is set as an area where the first control channel is to be arranged. In addition, the number of OFDM symbols in the area where the first control channel is to be arranged can be set for each sub-frame. The resource elements in a solid white color represent an area where the second control channel or the shared channel is to be arranged. The area where the second control channel or the shared channel is to be arranged can be set for each resource block pair. The rank of the control channel to be mapped to the second control channel region or the data channel to be mapped to the shared channel region can be set different from the rank of the control signal to be mapped to the first control channel.

The number of resource blocks can be changed in accordance with the frequency bandwidth (system bandwidth) used in the communication system. For example, 6 to 110 resource blocks can be used, the unit of which is also called a component carrier. A base station can further set a plurality of component carriers for a terminal by using frequency aggregation. For example, a base station may set five component carriers contiguous and/or non-contiguous in the frequency direction for a terminal, where the bandwidth of each component carrier is 20 MHz, thereby totaling a bandwidth of 100 MHz which can be supported by the communication system.

Figure 5:
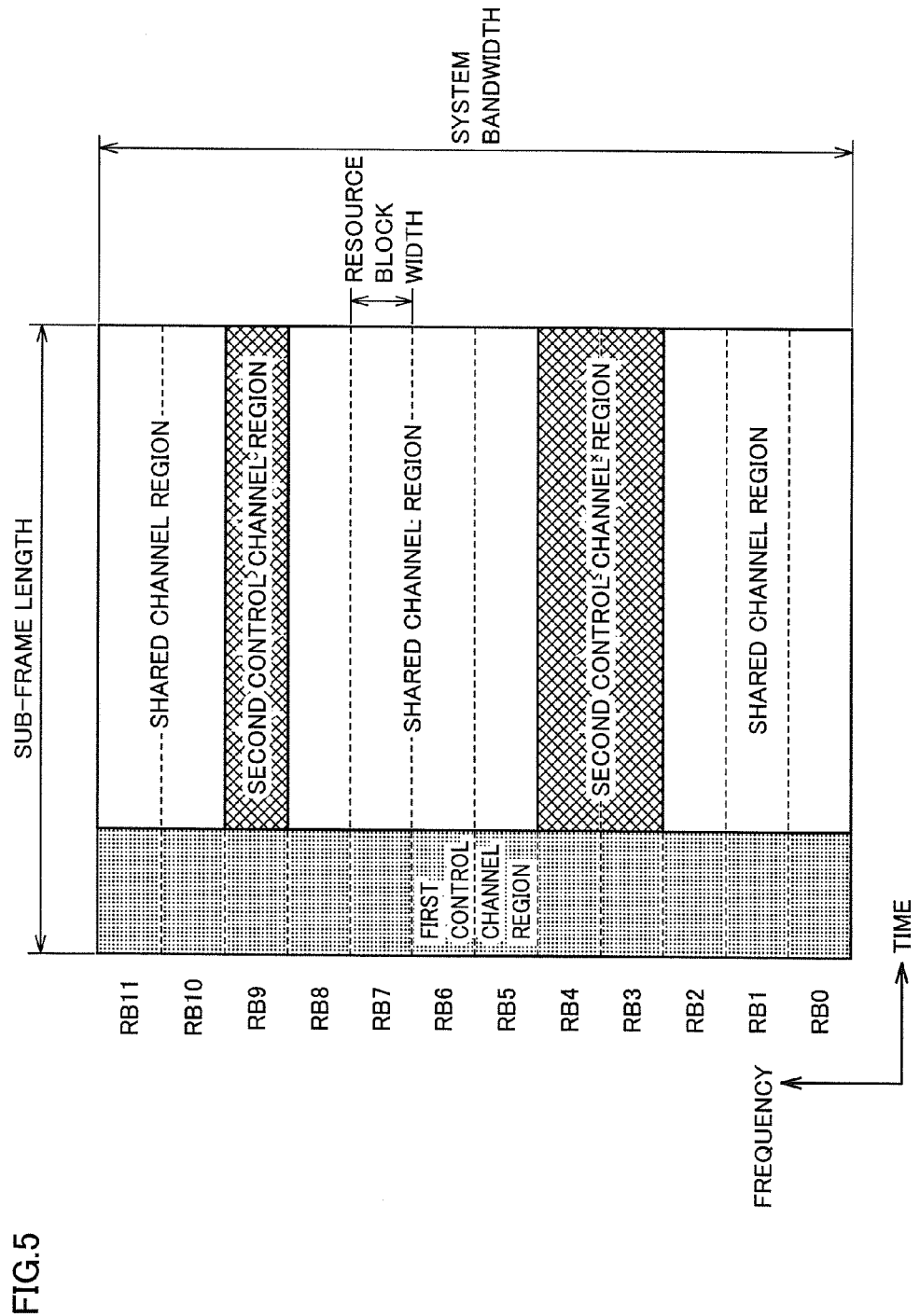
FIG. 5 is a diagram illustrating an example of channels that the base station 101 maps.

FIG. 5 is a diagram illustrating an example of channels that the base station 101 maps. In the case illustrated in FIG. 5, a frequency bandwidth of 12 resource block pairs is used as the system bandwidth. The first control channel, or PDCCH, is arranged in the top first to third OFDM symbols in a sub-frame. The first control channel extends over the system bandwidth in the frequency direction. The shared channel is arranged in the OFDM symbols other than the OFDM symbols for the first control channel in the sub-frame.

The details of the configuration of the PDCCH will now be described. The PDCCH is composed of a plurality of control channel elements (CCEs). The number of CCEs used in each downlink component carrier depends on the downlink component carrier bandwidth, the number of OFDM symbols constituting the PDCCH, and the number of transmit ports for downlink reference signals (cell-specific reference signal) which depends on the number of transmit antennas in the base station used for communication. Each CCE is composed of a plurality of downlink resource elements (resources each defined by one OFDM symbol and one subcarrier).

CCEs used between a base station and a terminal are assigned respective numbers to identify the CCEs. The numbering of the CCEs is based on a predetermined rule. Here, CCE_t denotes the CCE having the CCE number t. The PDCCH is constituted by an aggregation of a plurality of CCEs (CCE Aggregation). The number of CCEs in this aggregation is referred to as "CCE aggregation level". The CCE aggregation level in the PDCCH is set in the base station in accordance with a coding rate set for the PDCCH and the number of bits in a DCI included in the PDCCH. The combination of CCE aggregation levels which can be possibly used for the terminal is determined in advance. An aggregation of n CCEs is referred to as "CCE aggregation level n".

One resource element group is composed of four neighboring downlink resource elements in the frequency domain. Each CCE is composed of nine different resource element groups that are scattered in the frequency domain and the time domain. Specifically, all the resource element groups assigned numbers for the entire downlink component carrier are interleaved in units of resource element groups using a block interleaver, and nine resource element groups having contiguous numbers, which have been interleaved, constitute one CCE.

An area SS (Search Space) in which a PDCCH is searched for is set for each terminal. Each SS is composed of a plurality of CCEs. Each SS is formed of a plurality of CCEs having contiguous numbers, starting from the CCE having the smallest number, and the number of CCEs having contiguous numbers is determined in advance. An SS for each CCE aggregation level is composed of an aggregate of a plurality of PDCCH candidates. SSs are classified into a CSS (Cell-specific SS) for which numbers, starting from the number of the CCE having the smallest number, are common in a cell, and a USS (UE-specific SS) for which numbers, starting from the number of the CCE having the smallest number, are terminal-specific. In the CSS, a PDCCH to which control information to be read by a plurality of terminals, such as system information or information concerning paging, is assigned, or a PDCCH to which a downlink/uplink grant indicating instructions for a fallback to a low-level transmit scheme or random access is assigned can be arranged.

A base station transmits a PDCCH using one or more CCEs in an SS set in a terminal. The terminal decodes a received signal using one or more CCEs in the SS, and performs a process for detecting the PDCCH addressed to the terminal (referred to as blind decoding). The terminal sets different SSs for the respective CCE aggregation levels. Thereafter, the terminal performs blind decoding using predetermined combinations of CCEs in the different SSs for the respective CCE aggregation levels. In other words, the terminal performs blind decoding on each of the PDCCH candidates in the different SSs for the respective CCE aggregation levels. The above-described series of processes performed by the terminal is referred to as PDCCH monitoring.

Second control channels (X-PDCCH, PDCCH on PDSCH, Extended PDCCH) to be mapped to the second control channel region are arranged in the OFDM symbols other than the OFDM symbols for the first control channel. The second control channel region and the shared channel region are arranged in different resource blocks. Resource blocks in which the second control channel region and the shared channel region may be arranged are set for each terminal. The position where the OFDM symbols in which a second control channel is to be arranged start can be determined using a method similar to that for the shared channel. That is, the base station 101 sets some resources in the first control channel as a PCFICH (Physical control format indicator channel), and maps information indicating the number of OFDM symbols for the first control channel, thereby achieving the determination of the position where the OFDM symbols in which the second control channel is to be arranged start.

The position where the OFDM symbols in which the second control channel region is to be arranged start can be defined in advance, and can be set to, for example, the top fourth OFDM symbol in the sub-frame. In this case, if the number of OFDM symbols for the first control channel region is less than or equal to 2, the second to third OFDM symbols in the resource block pair where the second control channel region is to be arranged are set to null without mapping a signal. Other control channels or data channels can further be mapped to the resources set to null. The position where the OFDM symbols setting the second control channel region start can be set through higher-layer control information. The sub-frame illustrated in FIG. 5 is time-multiplexed, and the second control channel region can be set for each sub-frame.

A base station and a terminal can configure an SS in which the terminal searches for an X-PDCCH, using a plurality of CCEs in a manner similar to that for a PDCCH. That is, a base station and a terminal configure a resource element group from a plurality of resource elements in an area that is set as an area for the second control channel illustrated in FIG. 5, and further configure a CCE from a plurality of resource elements. Accordingly, a base station and a terminal can configure an SS in which the terminal searches for (monitors) an X-PDCCH in a manner similar to that in the case of the PDCCH described above.

Alternatively, a base station and a terminal can configure, unlike a PDCCH, an SS in which the terminal searches for an X-PDCCH, using one or more resource blocks. That is, an SS may be composed of an aggregation of one or more resource blocks (RB Aggregation), in units of resource blocks in an area that is set as the area for the second control channel illustrated in FIG. 5. The number of RBs included in this aggregation is referred to as an "RB aggregation level". An SS is composed of a plurality of RBs having contiguous numbers, starting from the RB having the smallest number, and the number of one or more RBs having contiguous numbers is determined in advance. An SS for each RB aggregation level is composed of an aggregate of a plurality of X-PDCCH candidates.

A base station transmits an X-PDCCH using one or more RBs in an SS set in a terminal. The terminal decodes a received signal using one or more RBs in the SS, and performs a process for detecting the X-PDCCH addressed to the terminal (performs blind decoding). The terminal sets different SSs for the respective RB aggregation levels. Thereafter, the terminal performs blind decoding using predetermined combinations of RBs in the different SSs for the respective RB aggregation levels. In other words, the terminal performs blind decoding on each of the X-PDCCH candidates in the different SSs for the respective RB aggregation levels (monitors the X-PDCCH).

In a case where the base station 101 is to notify the terminal 102 of a control channel through the second control channel region, the base station 101 sets the monitoring of the second control channel for the terminal 102, and then maps the control channel for the terminal 102 to the second control channel region. In a case where the base station 101 is to notify the terminal 102 of a control channel via the first control channel region, the base station 101 maps the control channel for the terminal 102 to the first control channel region without setting the monitoring of the second control channel for the terminal 102.

On the other hand, in a case where the monitoring of the second control channel is set by the base station 101, the terminal 102 performs blind decoding of the control channel addressed to the terminal 102 in the second control channel region. In a case where the monitoring of the second control channel is not set by the base station 101, the terminal 102 does not perform blind decoding of the control channel addressed to the terminal 102 in the second control channel.

Hereinafter, a description will be given of the control channel to be mapped to the second control channel region. The control channel to be mapped to the second control channel region is processed for each piece of control information on one terminal, and is subjected to processes such as, similarly to the data channel, a scrambling process, a modulation process, a layer mapping process, and a precoding process. The control channel to be mapped to the second control channel region is subjected to a precoding process specific to the terminal 102 together with the terminal-specific reference signal. In this case, the precoding process is preferably performed with precoding weights suitable for the terminal 102.

In a case where an SS is composed of one or more resource blocks, the control channel to be mapped to the second control channel region can be mapped so as to include different kinds of control information for the front slot (first slot) and the rear slot (second slot) in a sub-frame. For example, a control channel including allocation information (downlink allocation information) for a downlink shared channel to be transmitted from the base station 101 to the terminal 102 is mapped to the front slot in a sub-frame. A control channel including allocation information (uplink allocation information) for an uplink shared channel to be transmitted from the terminal 102 to the base station 101 is mapped to the rear slot in the sub-frame. A control channel including uplink allocation information transmitted from the base station 101 to the terminal 102 may be mapped to the front slot in a sub-frame, and a control channel including downlink allocation information transmitted from the terminal 102 to the base station 101 may be mapped to the rear slot in the sub-frame.

A data channel for the terminal 102 or any other terminal may be mapped to the front and/or rear slot for the second control channel. A control channel for the terminal 102 or a terminal for which the second control channel has been set (including the terminal 102) may be mapped to the front and/or rear slot for the second control channel.

The base station 101 multiplexes the terminal-specific reference signal to the control channel to be mapped to the second control channel region. The terminal 102 performs a demodulation process on the control channel to be mapped to the second control channel region, by using the terminal-specific reference signals to be multiplexed. Terminal-specific reference signals for some or all the antenna ports 7 to 14 are used. In this case, the control channel to be mapped to the second control channel region can be MIMO-transmitted using a plurality of antenna ports.

For example, a terminal-specific reference signal in the second control channel region is transmitted using a predefined antenna port and a scrambling code. Specifically, a terminal-specific reference signal in the second control channel region is generated using antenna port 7, which is defined in advance, and a scrambling ID.

For example, a terminal-specific reference signal in the second control channel region is generated using an antenna port and a scrambling ID which are sent via RRC signaling or PDCCH signaling. Specifically, either antenna port 7 or antenna port 8 is notified as the antenna port to be used for a terminal-specific reference signal in the second control channel region via RRC signaling or PDCCH signaling. Any value of 0 to 3 is notified as the scrambling ID to be used for the terminal-specific reference signal in the second control channel region via RRC signaling or PDCCH signaling.

In the following, as an example of a method in which the base station 101 sets the second control channel for the terminal 102 (a method for setting the second control channel region and a method for setting the monitoring of the second control channel), the setting of the second control channel region and the setting of a transmission mode implicitly indicate the setting of the monitoring of the second control channel. The base station 101 notifies the terminal 102 of terminal-specific setting information for radio resources (RadioResourceConfigDedicated) through higher-layer control information, thereby setting the second control channel. The terminal-specific setting information for radio resources is control information used for the setting/change/release of resource blocks, the terminal-specific settings for the physical channel, and so forth.

Figure 6:
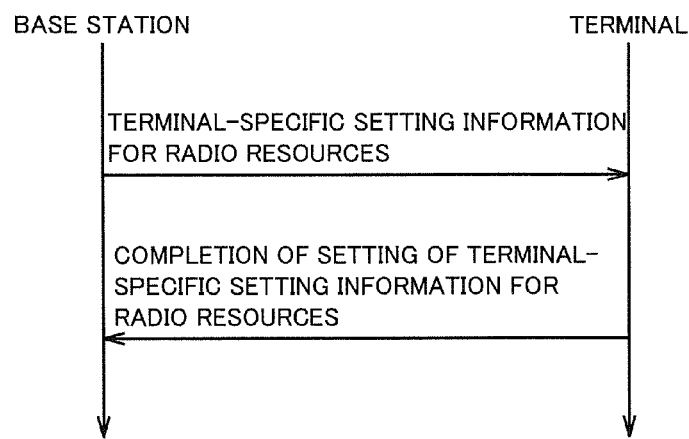
FIG. 6 is a diagram illustrating the flow for setting terminal-specific setting information for radio resources.

FIG. 6 is a diagram illustrating the flow for setting the terminal-specific setting information for radio resources. The base station 101 notifies the terminal 102 of the terminal-specific setting information for radio resources. The terminal 102 performs terminal-specific setting for radio resources in accordance with the terminal-specific setting information for radio resources sent from the base station 101, and then notifies the base station 101 of the completion of the setting of the terminal-specific setting information for radio resources.

Figure 7:
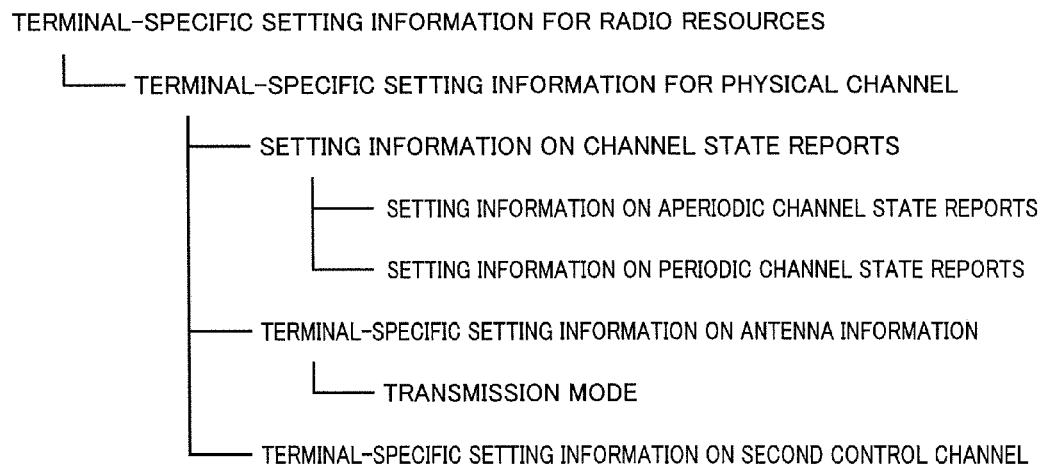
FIG. 7 is a diagram illustrating an example of the terminal-specific setting information for radio resources.

FIG. 7 is a diagram illustrating an example of the terminal-specific setting information for radio resources. The terminal-specific setting information for radio resources includes terminal-specific setting information for the physical channel (PhysicalConfigDedicated). The terminal-specific setting information for the physical channel is control information for defining terminal-specific settings for the physical channel. The terminal-specific setting information for the physical channel includes setting information on channel state reports (CQI-ReportConfig), terminal-specific setting information on antenna information (AntennaInfoDedicated), and terminal-specific setting information on the second control channel (XPDCCH-ConfigDedicated). The setting information on channel state reports is used to define setting information for reporting the channel state in the downlink 103. The terminal-specific setting information on antenna information is used to define terminal-specific antenna information in the base station 101. The terminal-specific setting information on the second control channel is used to define terminal-specific setting information on the second control channel.

The setting information on channel state reports includes setting information on aperiodic channel state reports (cqi-ReportModeAperiodic), and setting information on periodic channel state reports (CQI-ReportPeriodic). The setting information on aperiodic channel state reports is setting information for a periodically reporting the channel state in the downlink 103 via an uplink shared channel (PUSCH; Physical Uplink Shared Channel). The setting information of the periodic channel state report is setting information for periodically reporting the channel state in the downlink 103 via an uplink control channel (PUCCH; Physical Uplink Control Channel).

The terminal-specific setting information on antenna information includes a transmission mode. The transmission mode is information indicating a transmission method by which the base station 101 communicates with the terminal 102. For example, the transmission mode is defined as any of transmission modes 1 to 10 in advance. Transmission mode 1 is a transmission mode based on a single-antenna port transmission scheme in which antenna port 0 is used. Transmission mode 2 is a transmission mode based on a transmit diversity scheme. Transmission mode 3 is a transmission mode based on a cyclic delay diversity scheme. Transmission mode 4 is a transmission mode based on a closed-loop spatial multiplexing scheme. Transmission mode 5 is a transmission mode based on a multi-user MIMO scheme. Transmission mode 6 is a transmission mode based on a closed-loop spatial multiplexing scheme in which a single antenna port is used. Transmission mode 7 is a transmission mode based on a single-antenna port transmission scheme in which antenna port 5 is used. Transmission mode 8 is a transmission mode based on a closed-loop spatial multiplexing scheme in which antenna ports 7 to 8 are used. Transmission mode 9 is a transmission mode based on a closed-loop spatial multiplexing scheme in which antenna ports 7 to 14 are used. Transmission modes 1 to 9 are also referred to as first transmission modes.

Transmission mode 10 is defined as a transmission mode different from transmission modes 1 to 9. For example, transmission mode 10 can be a transmission mode based on a CoMP scheme. Here, extensions with the employment of the CoMP scheme include the optimization of channel state reports, improvements in accuracy (for example, the employment of information suitable for CoMP communication, such as precoding information and phase difference information between base stations), and so forth. Transmission mode 10 can also be a transmission mode based on a communication scheme which is an extended (enhanced) version of the multi-user MIMO scheme and which can be achieved using the communication schemes specified in transmission modes 1 to 9. The extended version of the multi-user MIMO scheme includes the optimization of channel state reports and improvements in accuracy (for example, the employment of information suitable for multi-user MIMO communication, such as CQI (Channel Quality Indicator) information), improvements in orthogonality between terminals to be multiplexed to the same resource, and so forth.

Transmission mode 10 can also be a transmission mode based on a CoMP scheme and/or an extended multi-user MIMO scheme in addition to all or some of the communication schemes specified in transmission modes 1 to 9. For example, transmission mode 10 can be a transmission mode based on a CoMP scheme and/or an extended multi-user MIMO scheme in addition to the communication scheme specified in transmission mode 9. Alternatively, transmission mode 10 can be a transmission mode in which a plurality of channel state measurement reference signals (CSI-RS; Channel State Information-RS) can be set. Transmission mode 10 is also referred to as a second transmission mode.

A base station can communicate with a terminal set to transmission mode 10 in which a plurality of transmission schemes can be used, without notifying the terminal of which of the plurality of transmission schemes was used when transmitting the data channel. That is, when receiving the data channel, the terminal can communicate with the base station without being notified of which of the plurality of transmission schemes was used even if the terminal is set to transmission mode 10 in which a plurality of transmission schemes can be used.

The second transmission mode is a transmission mode in which the second control channel can be set. That is, in a case where the base station 101 sets the first transmission mode for the terminal 102, the base station 101 maps the control channel for the terminal 102 to the first control channel region. In a case where the base station 101 sets the second transmission mode for the terminal 102, the base station 101 maps the control channel for the terminal 102 to the first control channel region or the second control channel region. On the other hand, in a case where the terminal 102 is set to the first transmission mode by the base station 101, the terminal 102 performs blind decoding on the first control channel. In a case where the terminal 102 is set to the second transmission mode by the base station 101, the terminal 102 performs blind decoding on one of the first control channel and the second control channel.

In a case where the terminal 102 is set to (configured with) the second transmission mode, the terminal 102 switches (selects) the control channel to be subjected to blind decoding in accordance with whether the terminal-specific setting information on the second control channel has been set by the base station 101. That is, in a case where the terminal 102 is set to the second transmission mode and the terminal-specific setting information on the second control channel is set by the base station 101, the terminal 102 performs blind decoding of the second control channel. In a case where the terminal 102 is set to the second transmission mode and the terminal-specific setting information on the second control channel is not set by the base station 101, the terminal 102 performs blind decoding of the first control channel.

Furthermore, in a case where the terminal 102 is set to the second transmission mode and is further set to the first transmission mode by the base station 101 after the terminal-specific setting information on the second control channel has been set, the terminal 102 performs blind decoding of the first control channel. In a case where the terminal 102 is set to the second transmission mode and is further set to some or all the first transmission modes by the base station 101 after the terminal-specific setting information on the second control channel has been set, the terminal 102 may perform blind decoding of the second control channel.

Transmission modes (second transmission mode) in which the second control channel can be set may include some or all the transmission modes in which the terminal-specific reference signals can be used. The transmission modes in which the second control channel can be set may be, for example, transmission modes 8 to 10. Transmission modes (first transmission mode) in which only the first control channel can be set may include some or all the transmission modes in which it is not possible to use the terminal-specific reference signals. The transmission modes in which only the first control channel can be set may be, for example, transmission modes 1 to 7.

Figure 8:
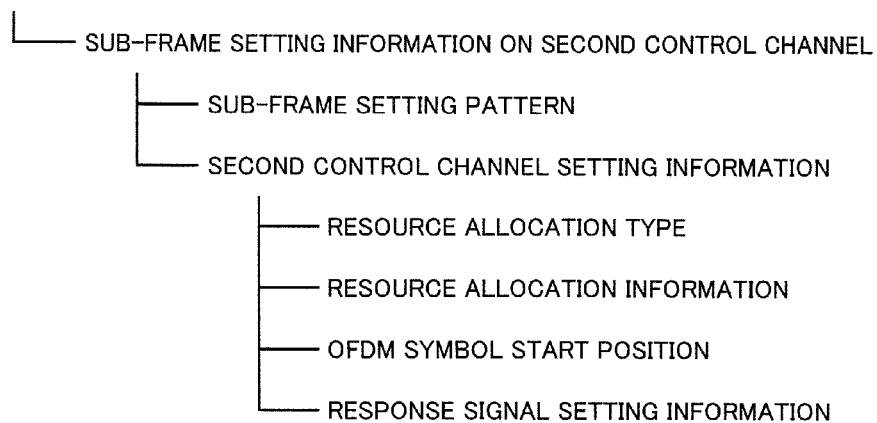
FIG. 8 is a diagram illustrating an example of terminal-specific setting information on a second control channel.

FIG. 8 is a diagram illustrating an example of the terminal-specific setting information on the second control channel. The terminal-specific setting information on the second control channel includes sub-frame setting information on the second control channel (XPDCCH-SubframeConfig-r11). The sub-frame setting information on the second control channel is used to define sub-frame information for setting the second control channel. The sub-frame setting information on the second control channel includes a sub-frame setting pattern (subframeConfigPattern-r11), and second control channel setting information (xpdcch-Config-r11).

The sub-frame setting pattern is information indicating a sub-frame in which the second control channel is to be set. For example, the sub-frame setting pattern is n-bit bitmap information. The information contained in each bit indicates whether the current sub-frame is a sub-frame to be set as a second control channel. That is, in the sub-frame setting pattern, n sub-frames can be set as a period. In this case, certain sub-frames to which a synchronization signal, a broadcast channel, and so forth are to be mapped can be excluded. Specifically, the remainder of dividing the sub-frame number defined in each sub-frame by n corresponds to each bit in the sub-frame setting pattern. For example, n is set in advance to a value such as 8 or 40. If the information for a certain sub-frame in the sub-frame setting pattern is "1", this sub-frame is set as a second control channel. If the information for a certain sub-frame in the sub-frame setting pattern is "0", this sub-frame is not set as a second control channel sub-frame. In addition, certain sub-frames to which a synchronization signal for synchronizing the terminal 102 with the base station 101, a broadcast channel for broadcasting control information on the base station 101, and so forth are to be mapped may be prevented from being set as a second control channel in advance. In another example of the sub-frame setting pattern, a pattern of sub-frames to be set as a second control channel is formed as an index in advance, and information indicating the index is defined as a sub-frame setting pattern.

The second control channel setting information includes resource allocation type (resourceAllocationType-r11), resource allocation information (resourceBlockAssignment-r11), OFDM symbol start position (xpdcch-Start-r11), and response signal control information (pucch-Config-r11).

The resource allocation type is information indicating a format (type) of information specifying a resource block to be set as a second control channel in a sub-frame. The resource allocation information is information specifying a resource block to be set as a second control channel, and is defined based on the format of the resource allocation type.

For example, the resource allocation type can define types 0 to 2. If the resource allocation type is type 0, the resource allocation information is bitmap information that can be assigned to each resource block group defined in units of a plurality of contiguous resource blocks. The number of resource blocks in a resource block group can be defined in accordance with the system bandwidth. If the resource allocation type is type 1, the resource allocation information is bitmap information that can be assigned to each resource block in a plurality of resource block group subsets, where each resource block group subset is defined in a plurality of subsets in units of resource block groups. The resource allocation information also includes information indicating a selected resource block group subset. If the resource allocation type is type 1, the resource allocation information is information indicating a resource block with which allocation starts in contiguous resource blocks, and information indicating the number of resource blocks to be allocated.

The OFDM symbol start position is information indicating the position of the OFDM symbol with which the second control channel starts in a sub-frame. For example, the OFDM symbol start position indicates any of 1 to 3. As in the description with reference to FIG. 5, the OFDM symbol start position for the second control channel may be identified through PCFICH. The OFDM symbol start position for the second control channel can be defined in advance, in which case the OFDM symbol start position may not necessarily be notified.

The response signal control information is resource allocation information for the uplink control channel for giving notification of a response signal (for example, ACK (Acknowledge), NACK (Negative ACK), or the like) indicating whether the terminal 102 has correctly received the data channel specified in the control information sent via the second control channel.

As described above, in a case where the base station 101 is to set the second control channel, the base station 101 notifies the terminal 102 of the terminal-specific setting information for radio resources, which includes the terminal-specific setting information on the second control channel, via RRC signaling. Also, in a case where the base station 101 is to change the set second control channel, the base station 101 notifies the terminal 102 of the terminal-specific setting information for radio resources, which includes the terminal-specific setting information on the second control channel whose parameters have been changed, via RRC signaling. Also, in a case where the base station 101 is to release the set second control channel, the base station 101 notifies the terminal 102 via RRC signaling. For example, the base station 101 notifies the terminal 102 of the terminal-specific setting information for radio resources, which does not include the terminal-specific setting information on the second control channel. Alternatively, the base station 101 may notify the terminal 102 of control information for releasing the terminal-specific setting information on the second control channel.

Figure 9:
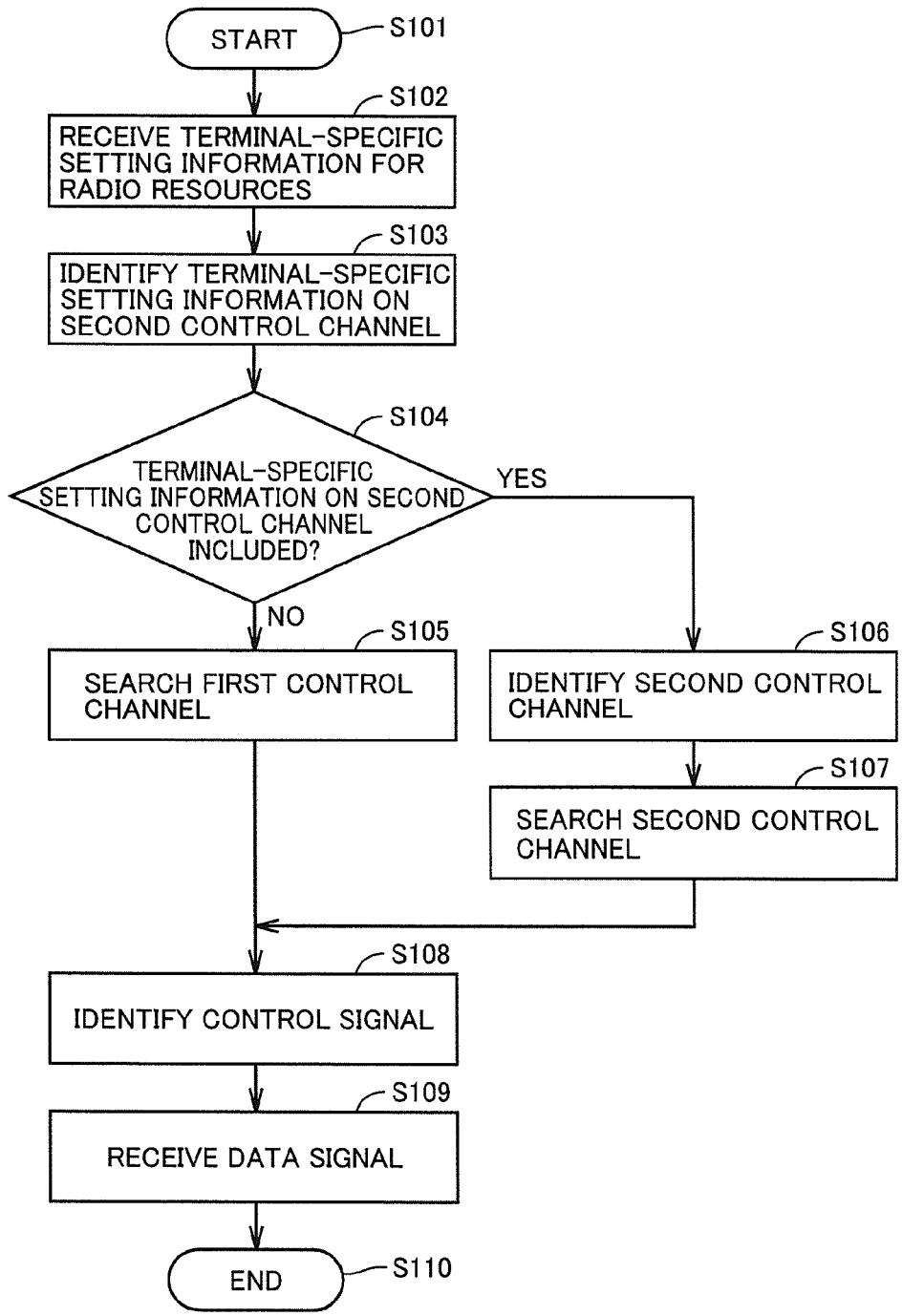
FIG. 9 is a diagram illustrating the flow for a process for receiving a control channel and a data channel at the terminal 102.

FIG. 9 is a diagram illustrating the flow for a process for receiving the control channel and the data channel at the terminal 102. In step S102, the terminal 102 receives terminal-specific setting information for radio resources via RRC signaling. In step S103, the terminal 102 identifies the received terminal-specific setting information for radio resources, and performs a terminal-specific setting process for the radio resources. In step S104, the terminal 102 determines whether the terminal-specific setting information for radio resources includes terminal-specific setting information on the second control channel. If terminal-specific setting information on the second control channel is included, in step S106, the terminal 102 identifies the terminal-specific setting information on the second control channel, and sets the second control channel. In step S107, the terminal 102 searches for (blind decoding) and detects the control channel addressed to the terminal 102 in the set second control channel region. On the other hand, if terminal-specific setting information on the second control channel is not included, in step S105, the terminal 102 searches for (blind decoding) and detects the control channel addressed to the terminal 102 in the first control channel region set in advance. In step S108, the terminal 102 identifies the detected control channel. In step S108, if the terminal 102 has failed to detect the control channel addressed to the terminal 102, the receiving process for the current sub-frame ends. In step S109, the terminal 102 performs setting for receiving the data channel in accordance with the detected control channel, and receives the data channel.

With the use of the method described above, the base station 101 can efficiently notify the terminal 102 of control information. That is, the base station 101 can map the control channel for the terminal 102 to the first control channel region or the second control channel region. Accordingly, the base station 101 can perform efficient resource allocation scheduling of the control channel of which a plurality of terminals are notified. In addition, the terminal 102 can be mapped with the control channel by the base station 101 via the first control channel region or the second control channel region. Accordingly, the terminal 102 can reduce the number of candidates in which the control channel is searched for, and can perform an efficient receiving process.

In the above example, a control channel for a terminal set to any of transmission modes 1 to 10 can be mapped to the first control channel region, and a control channel for a terminal set to transmission mode 10 can be mapped to the second control channel region. That is, the base station 101 can notify the terminal 102 of a control channel via the first control channel region regardless of the transmission mode to be set for the terminal 102. Furthermore, in a case where the base station 101 is to set transmission mode 10 for the terminal 102, the base station 101 can notify the terminal 102 of a control channel via the second control channel region. Accordingly, the base station 101 can perform resource allocation scheduling taking a communication scheme achievable with transmission mode 10 into account.

Particularly in transmission mode 10 in which the second control channel can be set, the base station 101 can implement a CoMP communication scheme, a multi-user MIMO communication scheme, and so forth for the terminal 102, and can thus perform resource allocation scheduling taking these communication schemes into account. Since the first control channel can be set for all terminals, the base station 101 can maintain backward compatibility with terminals for which transmission mode 10 is difficult to set. The notification of the control channel via the first control channel region can be achieved without setting the second control channel, and therefore the overhead of the control information in RRC signaling can be reduced.

The base station 101 notifies the terminal 102 of the control channel while switching between only the first control channel to be used and the second control channel to be used, and the terminal 102 switches the control channel region in which the control channel is monitored (blind decoding is performed) in accordance with the instruction of the base station 101. More specifically, the base station 101 determines whether the second control channel region is to be used for the transmission of the control channel addressed to the terminal 102, and explicitly or implicitly notifies the terminal. Further, the base station 101 sends the settings of the second control channel to the terminal through signaling. Upon being explicitly or implicitly notified of the use of the second control channel by the base station 101, the terminal 102 monitors the second control channel in accordance with the settings of the second control channel. If the terminal 102 is not explicitly or implicitly notified of the use of the second control channel by the base station 101, the terminal 102 monitors only the first control channel.

The switching of the control channel is controlled in accordance with an explicit or implicit notification from the base station 101 to the terminal 102 as to whether the second control channel is to be used. In the foregoing description, the description has been given of, but not limited to, an example in which notification as to whether the second control channel is to be used is implicitly given in accordance with the transmission mode sent from the base station 101 to the terminal 102 and control information for setting the second control channel.

For example, an agreement that only the first control channel is used in the first transmission mode and the second control channel can be used in the second transmission mode is established in advance between the base station 101 and the terminal 102. Further, the base station 101 notifies the terminal 102 of the second control channel setting information. Then, the base station 101 notifies the terminal 102 of a transmission mode, thereby implicitly notifying whether the second control channel is to be used. The base station 101 notifies the terminal 102 of second control channel region setting information, and the terminal 102, which has been notified of the second transmission mode, monitors the second control channel. The terminal 102, which has been notified of the first transmission mode, monitors only the first control channel. That is, the control channel to be monitored by the terminal 102 is implicitly switched in accordance with the transmission mode of which the base station 101 notifies the terminal 102.

In another example, an agreement that (i) only the first control channel is used in a case where the second control channel setting information (such as setting information on the second control channel region) is not included even once in signaling such as RRC signaling or in a case where the second control channel setting information is not set in the terminal by releasing the second control channel setting information, and (ii) the second control channel can be used in a case where the second control channel setting information is notified through signaling and in a case where the second control channel setting information is set in the terminal is established in advance between the base station 101 and the terminal 102. Then, the base station 101 implicitly notifies the terminal 102 of whether the second control channel is to be used, depending on whether the second control channel setting information is to be set through signaling from the base station 101 to the terminal 102. In a case where the base station 101 sets the second control channel setting information in the terminal, the terminal 102 monitors the second control channel. In a case where the base station does not set the second control channel setting information in the terminal, the terminal 102 monitors only the first control channel without monitoring the second control channel. That is, the control channel to be monitored by the terminal 102 is implicitly switched in accordance with setting information for setting the second control channel, which is control information of which the base station 101 notifies the terminal 102.

In still another example, the base station 101 notifies the terminal 102 of the second control channel region setting information. In addition, the base station 101 explicitly notifies the terminal 102 of setting information indicating whether the second control channel is to be used, through signaling such as RRC signaling. If the setting information indicating whether the second control channel is to be used indicates that the second control channel is to be used, the terminal 102 monitors the second control channel. If the setting information indicating whether the second control channel is to be used from the base station 101 to the terminal 102 indicates that the second control channel is not to be used, the terminal 102 monitors only the first control channel. The base station 101 and the terminal 102 may switch the control channel to be monitored by the terminal 102 in accordance with whether the setting information indicating that the second control channel is to be used has been set.

In still another example, the base station 101 notifies the terminal 102 of the second control channel region setting information. The base station 101 notifies the terminal 102 of the enabling/disabling of the second control channel through signaling such as physical control information. In a case where the terminal 102 is notified of control information indicating the enabling of the second control channel via the first control channel, the terminal 102 starts the monitoring of the second control channel from the sub-frame for which the terminal 102 has been notified of the enabling of the second control channel. In a case where the terminal is notified of disabling of the second control channel via the first control channel or the second control channel, the terminal stops the monitoring of the second control channel from the sub-frame subsequent to the sub-frame for which the terminal has been notified of the disabling of the second control channel. The enabling/disabling of the second control channel may be indicated by using the code point in certain downlink control information (such as indicating that the second control channel is enabled in a case where the bit sequence in the control information format is a certain bit sequence), or by using masking with a certain code (such as indicating that the second control channel is enabled if it is masked with a certain code).

Accordingly, the terminal 102 can switch the control channel in accordance with any explicit or implicit notification given by the base station 101.

In this manner, according to a point of view, the base station 101 and the terminal 102 switch between a physical control channel that uses the same transmit port as that for a cell-specific reference signal and a physical control channel that uses the same transmit port as that for a terminal-specific reference signal. This allows the base station 101 to perform a demodulation process on the control channel for the terminal 102 using any of a cell-specific reference signal and a terminal-specific reference signal in accordance with the situation, thereby implementing resource allocation scheduling taking the performance obtained from the respective reference signals into account. That is, (i) in cases such as when the initial access to a base station is made by a terminal or when the number of terminals accommodated by a base station is small and there is no shortage of the capacity of a PDCCH, the terminal 102 performs, by using the control channel to be mapped to the first control channel region, a demodulation process using a cell-specific reference signal, and (ii) in cases such as when the number of terminals accommodated by a base station increases and there is a shortage of the capacity of a PDCCH, the terminal 102 performs, by using the control channel to be mapped to the second control channel region, a demodulation process using a terminal-specific reference signal.

In particular, a terminal that performs CoMP communication switches the control channel to a physical control channel that uses the same transmit port as that for a terminal-specific reference signal. Since a control channel that is demodulated using a terminal-specific reference signal can be subjected to a precoding process suitable for the terminal 102, the terminal 102 can receive a control channel via a transmission channel excellent in transmission performance. In addition, for a control channel notified using a terminal-specific reference signal, even in a case where the same control channel is transmitted from a plurality of base stations, a combined channel state obtained from the respective base stations can be estimated. Thus, the terminal 102 does not need to individually estimate the respective channel states of the base stations in CoMP communication, and can achieve an efficient receiving process. In addition, for a control channel that is demodulated using a cell-specific reference signal, there is no need to use any new resource, unlike a terminal-specific reference signal, when the terminal 102 demodulates the control channel. Therefore, the base station 101 can efficiently notify the terminal 102 of a control channel without increasing overhead.

To achieve the above advantages, there is no need for a limitation in which the resource (first control channel region) where the first control channel is to be arranged and the resource (second control channel region) where the second control channel is to be arranged are different from each other. Even in a case where the first control channel and the second control channel are arranged in the same resource, such as when both the first control channel and the second control channel use the PDSCH region, the above advantages are achieved as long as transmit ports associated with the respective control channels are those for a cell-specific reference signal and a terminal-specific reference signal. To achieve the above advantages, furthermore, there is no need for a limitation in which the second control channel is a terminal-specific physical control channel. Even in a case where the second control channel is a cell-specific physical control channel, such as when the second control channel setting information is broadcasted via a broadcast channel and a plurality of terminals accommodated by a base station share and use this setting information, the above advantages are achieved as long as transmit ports associated with the respective control channels are those for a cell-specific reference signal and a terminal-specific reference signal. In this case, the terminal-specific reference signal is a preset terminal-specific reference signal.

In the foregoing description, by way of example, but not limited thereto, in a case where the monitoring of the second control channel is set through signaling from the base station 101 to the terminal 102, the terminal 102 monitors the second control channel. For example, the terminal 102 sets the monitoring of the second control channel through signaling from the base station 101 to the terminal 102. In this case, the terminal 102 monitors, in addition to the second control channel in one sub-frame, the first control channel in the same sub-frame. That is, the terminal 102 searches for the first control channel in an SS in which the first control channel is searched for and searches for the second control channel in an SS in which the second control channel is searched for within one sub-frame.

In this case, various methods may be used as an example of the SS setting method or the monitoring method. For example, a CSS and a USS (first USS) set in the first control channel region, and a USS (second USS) is set in the second control channel region. If the monitoring of the second control channel is set through signaling from the base station 101 to the terminal 102, the terminal 102 searches for the first control channel in the CSS, and searches for the second control channel in the USS.

In the foregoing description, the description has been given of, but not limited to, the case where control information with which the base station 101 sets the second control channel for the terminal 102 is information specific to the terminal 102. Control information with which the base station 101 sets the second control channel for the terminal 102 may be information specific to the base station 101. For example, the base station 101 may broadcast control information for setting the second control channel to each terminal via a broadcast control channel (BCH; Broadcast Channel). Accordingly, the base station 101 can reduce the overhead of control information for setting the second control channel. In addition, the base station 101 may notify each terminal of control information for setting the second control channel, via RRC signaling, as part of cell-specific setting information for radio resources (RadioResourceConfigCommon), which is information specific to the base station 101. Accordingly, the base station 101 does not need to schedule the setting of the second control channel for each terminal, thereby reducing the load for scheduling processing.

In the foregoing description, the description has been given of, but not limited to, a method for switching the control channel to be subjected to blind decoding by the terminal 102 in accordance with whether the base station 101 is to set the terminal-specific setting information on the second control channel for the terminal 102. For example, the base station 101 may notify the terminal 102 of information indicating whether the second control channel is to be set, via RRC signaling or PDCCH. In this case, control information for setting the second control channel may be broadcasted via a broadcast control channel. In addition, the base station 101 may notify each terminal of control information for setting the second control channel, via RRC signaling, as part of cell-specific setting information for radio resources, which is information specific to the base station 101. Accordingly, the base station 101 can perform efficient setting of the terminal 102.

In the foregoing description, the description has been given of, but not limited to, a method for switching the control channel to be subjected to blind decoding by the terminal 102 in accordance with whether the base station 101 is to set the terminal-specific setting information on the second control channel for the terminal 102. For example, the base station 101 may set, for each sub-frame, whether the second control channel is to be set, and may notify the terminal 102 of bitmap information indicating the setting via RRC signaling or PDCCH. In this case, control information for setting the second control channel may be broadcasted via a broadcast control channel. In addition, the base station 101 may notify each terminal of control information for setting the second control channel, via RRC signaling, as part of cell-specific setting information for radio resources, which is information specific to the base station 101. Accordingly, the base station 101 can perform efficient setting of the terminal 102. The base station 101 can also perform efficient scheduling for the terminal 102.

Furthermore, in a case where the base station 101 sets for each sub-frame, using bitmap information, whether the second control channel is to be set, the setting for each sub-frame may be determined based on the setting of ABS (Almost Blank Subframe) in the base station 101 or any other base station. For example, in a sub-frame for the base station 101 that is transmitted simultaneously with a sub-frame that has been set to an ABS by a base station neighboring the base station 101, the base station 101 sets the first control channel for the terminal 102. In a sub-frame for the base station 101 that is transmitted simultaneously with a sub-frame that is not set to an ABS by a base station neighboring the base station 101, the base station 101 sets the second control channel for the terminal 102. An ABS is a sub-frame that is transmitted with reduced transmit power (including no transmission) with respect to channels including the shared channel, the first control channel, and/or the second control channel. The use of an ABS can reduce interference with a terminal that performs data communication with a base station neighboring a base station that has set an ABS. Therefore, interference coordination between base stations (ICIC; Inter-cell interference coordination) can be achieved.

Furthermore, the terminal 102 may select a control channel to be subjected to blind decoding, in accordance with a resource-restricted measurement pattern of which the base station 101 notifies the terminal 102. For example, the resource-restricted measurement pattern represents information on restricted measurement of RRM (Radio Resource Management)/RLM (Radio Link Control) in a serving cell, information on restricted measurement of RRM in neighboring base stations, and information on restricted measurement of CSI (Channel State Information) in a serving cell. In particular, the information on restricted measurement of CSI (Channel State Information) in a serving cell is set as two sub-frame subsets for the terminal 102. The terminal 102 measures the channel state in the sub-frames identified by the sub-frame subsets, and performs periodic or aperiodic reporting. The terminal 102 may further select a control channel to be subjected to blind decoding, in accordance with the sub-frame subsets. For example, the terminal 102 performs blind decoding of the first control channel in the sub-frames identified by one of the sub-frame subsets. The terminal 102 also performs blind decoding of the second control channel in the sub-frames identified by the other sub-frame subset. Links between the two sub-frame subsets and the two control channels may be defined in advance, or may be set by RRC signaling. In a case where the second control channel has not yet been set by the base station 101 in a sub-frame indicating the blind decoding of the second control channel, the terminal 102 performs blind decoding of the first control channel.

Second Embodiment

A second embodiment of the present invention will be described hereinafter. Similarly to the communication system according to the first embodiment, a communication system according to the second embodiment includes a base station 101 and a terminal 102. The following description will focus on a portion different from the first embodiment of the present invention.

In the communication system according to the second embodiment of the present invention, the base station 101 has a plurality of cells, and is capable of setting a serving cell in which the base station 101 performs data communication with the terminal 102 through carrier aggregation, where each cell is also called a component carrier (CC) and is capable of setting a specific cell ID.

Figure 10:
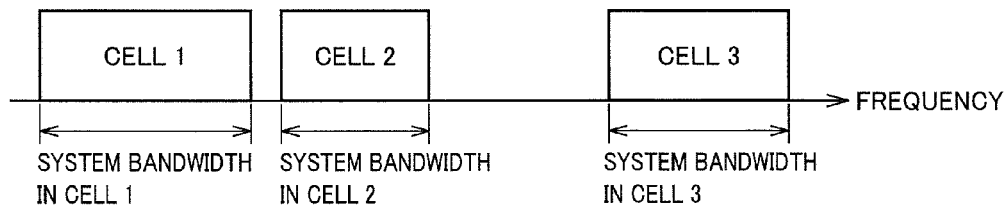
FIG. 10 is a diagram illustrating an example of frequency arrangement for cells with carrier aggregation according to a second embodiment of the present invention.

FIG. 10 is a diagram illustrating an example of a frequency arrangement for cells with carrier aggregation according to the second embodiment of the present invention. In the case illustrated in FIG. 10, the base station 101 can perform carrier aggregation using three cells (CCs, component carriers). In this case, cells with carrier aggregation can be arranged contiguously and/or non-contiguously in the frequency direction, and the respective system bandwidths of the cells can be set different.

In addition, in a case where the base station 101 is to set carrier aggregation for the terminal 102, the base station 101 can set a serving cell (serving CC) to be specific to the terminal 102. In this case, the base station 101 can set one primary cell (PCC, primary CC, PCell) and one or more secondary cells (SCCs, secondary CCs, SCells) for the terminal 102 as serving cells.

The primary cell is a cell in which the terminal 102 performs data communication at a primary frequency, and implements an initial setup process or a re-connection process with the base station 101. The primary cell is a cell identified as a primary cell in a handover process from other cells (base stations, CCs). The primary cell can be changed through the handover process. The primary cell is used for the transmission of an uplink control channel (PUCCH).

The secondary cell is a cell in which the terminal 102 performs data communication at a secondary frequency, and can be set (also including addition/release/change) via RRC signaling. For example, the secondary cell can be set at the time when RRC connection is established, and can be used to provide additional radio resources.

In addition, the secondary cell set using RRC signaling can be set to activation (valid) or deactivation (invalid). Activation or deactivation in the secondary cell is set to reduce battery consumption in the terminal 102. The terminal 102 does not receive (does not monitor) some or all channels in the secondary cell which is set to deactivation. The setting of activation or deactivation in the secondary cell is performed with a timer for the signaling of the MAC (Media Access Control) layer (MAC signaling) and deactivation. That is, the terminal 102 is notified of bitmap information indicating activation or deactivation for each secondary cell via MAC signaling. If the secondary cell is set to activation, the terminal 102 activates the secondary cell. In a case where the terminal 102 does not receive any control channel and/or data channel by the time designated by the timer for deactivation after the secondary cell is set to deactivation, the terminal 102 deactivates the secondary cell. In a case where the terminal 102 receives a control channel and/or a data channel by the time designated by the timer for deactivation after the secondary cell is deactivated, the terminal 102 activates the secondary cell.

For example, in the example in FIG. 10, the base station 101 sets cell 2 as the primary cell and cell 3 as the secondary cell for the terminal 102. The base station 101 is also capable of setting a second control channel on a cell-by-cell basis for the terminal 102.

In a case where a second control channel is set for the primary cell by the base station 101, the terminal 102 monitors the second control channel in the primary cell. In a case where no second control channel is set for the primary cell by the base station 101, the terminal 102 monitors the first control channel in the primary cell. In a case where the secondary cell is activated and a second control channel is set for the secondary cell by the base station 101, the terminal 102 monitors the second control channel in the secondary cell. In a case where the secondary cell is activated and no second control channel is set for the secondary cell by the base station 101, the terminal 102 monitors the first control channel in the secondary cell.

Furthermore, in a case where the secondary cell is set to deactivation, the terminal 102 performs a process based on a predefined method or the method of which the terminal 102 is notified by the base station 101. For example, in a case where the secondary cell is set to deactivation, the terminal 102 does not monitor the first control channel and the second control channel in the secondary cell regardless of whether a second control channel has been set. Thus, the terminal 102 can reduce monitoring processing for control channels. In another example, in a case where the secondary cell is set to deactivation, the terminal 102 does not monitor the second control channel in the secondary cell regardless of whether a second control channel has been set. Thus, the base station 101 can notify the terminal 102 of control information through the secondary cell. In another example, furthermore, in a case where the secondary cell is set to deactivation and a second control channel has been set, the terminal 102 monitors the second control channel in the secondary cell. Thus, the base station 101 can notify the terminal 102 of control information through the secondary cell.

In addition, switching as to whether the terminal 102 is to monitor the first control channel or is to monitor the second control channel in each cell can be made by applying the method described in the first embodiment of the present invention. That is, as described in the first embodiment of the present invention, the switching of control channels at the terminal 102 is controlled in accordance with an explicit or implicit notification from the base station 101 to the terminal 102 as to whether the second control channel is used.

The cell for which the base station 101 can set a second control channel for the terminal 102 may be defined in advance as a primary cell. In this case, control information for setting the second control channel may be implemented using the terminal-specific setting information for radio resources illustrated in FIG. 8. In a case where the cell for which a second control channel can be set is defined in advance as a primary cell, the terminal 102 sets control information on the second control channel, which is notified by the base station 101, for the primary cell.

Figure 11:
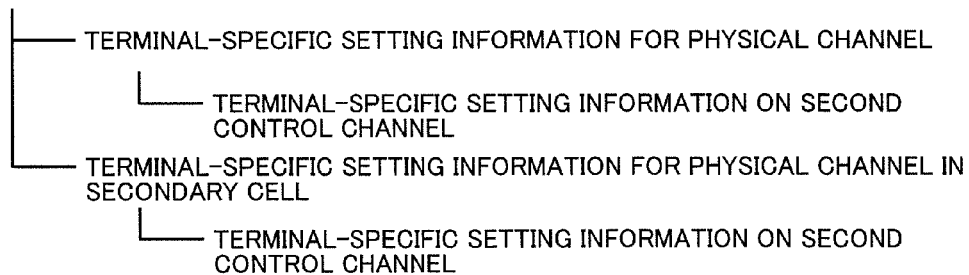
FIG. 11 is a diagram illustrating another example of the terminal-specific setting information for radio resources.

FIG. 11 is a diagram illustrating another example of the terminal-specific setting information for radio resources. In the case illustrated in FIG. 11, the base station 101 sets carrier aggregation in the terminal 102, and sets a second control channel individually for the primary cell and the secondary cell in the terminal 102. In the example illustrated in FIG. 11, the terminal-specific setting information for radio resources includes, in addition to the terminal-specific setting information for the physical channel described in the first embodiment, terminal-specific setting information for the physical channel in the secondary cell (PhysicalConfigDedicatedSCell-r11). The terminal-specific setting information for radio resources in FIG. 11 can be the terminal-specific setting information for radio resources in the primary cell.

The terminal-specific setting information for the physical channel is control information for defining terminal-specific settings for the physical channel in the primary cell. The terminal-specific setting information for the physical channel in the secondary cell is control information for defining terminal-specific settings for the physical channel in the secondary cell. The terminal-specific setting information for the physical channel and the terminal-specific setting information for the physical channel in the secondary cell each include terminal-specific setting information on the second control channel.

The terminal-specific setting information on the second control channel in FIG. 11 is similar to the terminal-specific setting information on the second control channel described with reference to FIG. 8, and can be independently set for the primary cell and the secondary cell. The second control channel can be set for either the primary cell or the secondary cell. In this case, the terminal-specific setting information on the second control channel is set for only the cell in which the second control channel is set.

With the use of the method illustrated in FIG. 11, the base station 101 can efficiently set a second control channel in the primary cell and the secondary cell for the terminal 102. In addition, since the terminal-specific setting information for the physical channel in each cell, which includes the terminal-specific setting information on the second control channel, is included in the terminal-specific setting information for radio resources, the base station 101 can perform adaptive setting for the terminal 102 in accordance with the channel state of the downlink or the state of the base station 101.

Figure 12:
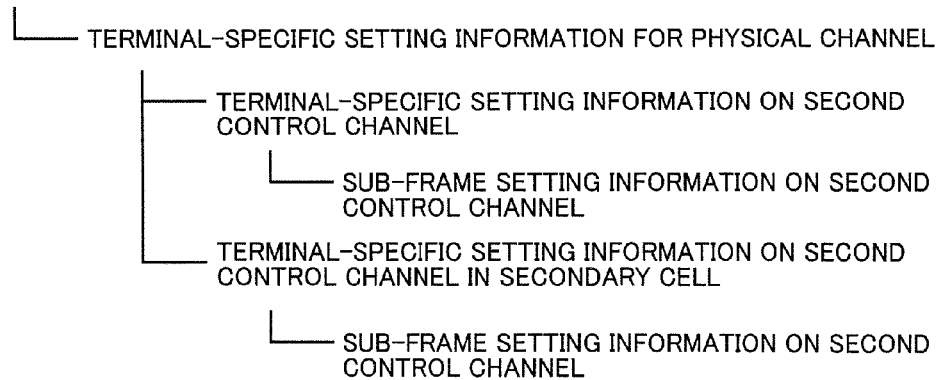
FIG. 12 is a diagram illustrating another example of the terminal-specific setting information for radio resources.

FIG. 12 is a diagram illustrating another example of the terminal-specific setting information for radio resources. In the case illustrated in FIG. 12, the base station 101 sets carrier aggregation in the terminal 102, and sets a second control channel individually for the primary cell and the secondary cell in the terminal 102. In the example illustrated in FIG. 12, the terminal-specific setting information for radio resources includes terminal-specific setting information for the physical channel. The terminal-specific setting information for the physical channel includes, in addition to the terminal-specific setting information on the second control channel described in the first embodiment, terminal-specific setting information on the second control channel in the secondary cell (XPDCCH-ConfigDedicatedSCell-r11). The terminal-specific setting information on the second control channel in FIG. 12 can be the terminal-specific setting information on the second control channel in the primary cell.

The terminal-specific setting information on the second control channel is used to define terminal-specific setting information on the second control channel in the primary cell. The terminal-specific setting information on the second control channel in the secondary cell is used to define terminal-specific setting information on the second control channel in the secondary cell. The terminal-specific setting information on the second control channel and the terminal-specific setting information on the second control channel in the secondary cell each include sub-frame setting information on the second control channel.

The sub-frame setting information on the second control channel in FIG. 12 is similar to the sub-frame setting information on the second control channel described in FIG. 8, and can be independently set for the primary cell and the secondary cell. The second control channel can be set for either the primary cell or the secondary cell. In this case, the terminal-specific setting information on the second control channel or the sub-frame setting information on the second control channel is set for only the cell in which the second control channel is set.

With the use of the method illustrated in FIG. 12, the base station 101 can efficiently set a second control channel in the primary cell and the secondary cell for the terminal 102. In addition, since the terminal-specific setting information on the second control channel in each cell is included in the terminal-specific setting information for the physical channel, the base station 101 can perform adaptive setting for the terminal 102 in accordance with the channel state of the downlink or the state of the base station 101 while reducing the overhead of the control information for the terminal 102.

Figure 13:
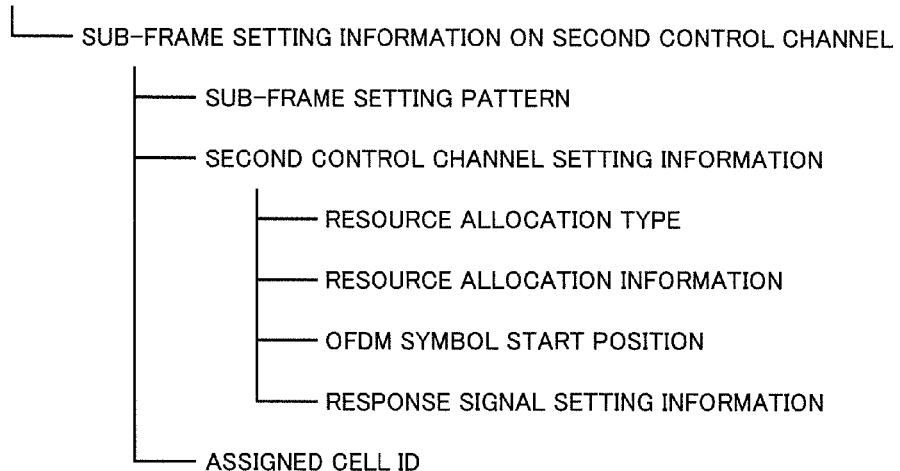
FIG. 13 is a diagram illustrating another example of the terminal-specific setting information on the second control channel.
Figure 14:
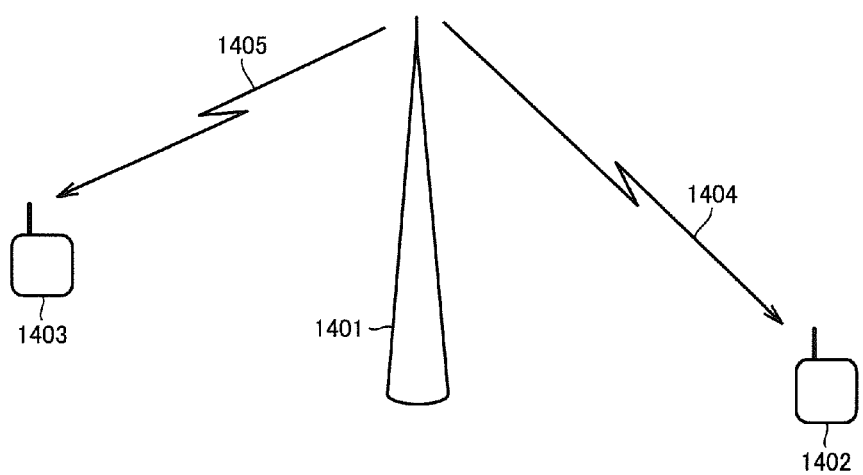
FIG. 14 is a diagram illustrating an example in which the multi-user MIMO scheme is implemented.
Figure 15:
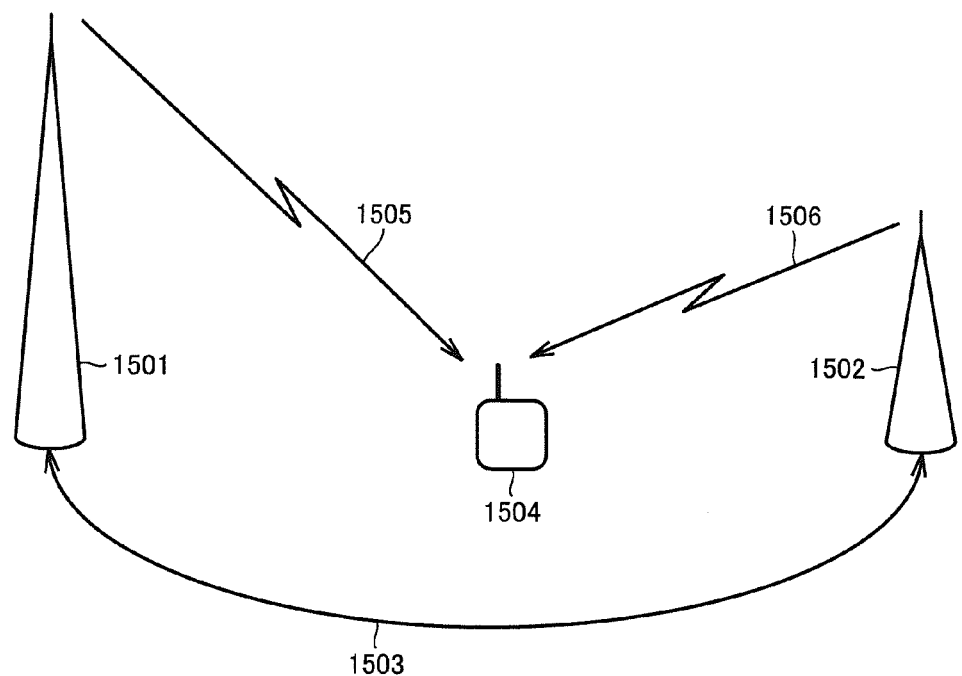
FIG. 15 is a diagram illustrating an example in which the CoMP scheme is implemented.

FIG. 13 is a diagram illustrating another example of the terminal-specific setting information on the second control channel. In the following description, the description will be given of a difference from the terminal-specific setting information on the second control channel described in FIG. 8. The sub-frame setting information on the second control channel included in the terminal-specific setting information on the second control channel further includes an assigned cell ID (schedulingCellId-r11).

The assigned cell ID is information indicating a cell in which the second control channel is set with the sub-frame setting information on the second control channel. The assigned cell ID is selected from among the serving cell set in the terminal 102 or a cell that can be set as carrier aggregation by the base station 101. For the assigned cell ID, one or a plurality of cells can be set. In a case where a plurality of assigned cell IDs are set, part or all of the sub-frame setting information on the second control channel can be setting information common to the respective cells. In a case where a plurality of assigned cell IDs are set, furthermore, the sub-frame setting information on the second control channel can be set individually the respective cells.

Furthermore, in a case where the cell identified by the assigned cell ID indicates a secondary cell and this secondary cell is set to deactivation, the terminal 102 performs a process based on a predefined method or the method notified by the base station 101. For example, the terminal 102 does not monitor the first control channel and the second control channel in the secondary cell regardless of the notified sub-frame setting information on the second control channel. Thus, the terminal 102 can reduce monitoring processing for control channels. In another example, the terminal 102 monitors either the first control channel or the second control channel in the secondary cell regardless of the setting of deactivation for the secondary cell. Thus, the base station 101 can notify the terminal 102 of control information through the secondary cell.

The terminal-specific setting information on the second control channel illustrated in FIG. 13 can be notified and set as control information for the primary cell and/or the secondary cell. In a case where the terminal-specific setting information on the second control channel illustrated in FIG. 13 is notified from only one cell, the terminal-specific setting information on the second control channel is preferably notified and set as control information for the primary cell.

With the use of the method illustrated in FIG. 13, the base station 101 can efficiently set a second control channel in the primary cell and the secondary cell for the terminal 102. In addition, since the sub-frame setting information on the second control channel is set so as to include the assigned cell ID, the base station 101 can perform adaptive setting for the terminal 102 in accordance with the channel state of the downlink or the state of the base station 101 while reducing the overhead of the control information for the terminal 102.

With the use of the methods described above, in addition to the advantages described in the first embodiment of the present invention, the base station 101 can efficiently set carrier aggregation for the terminal 102, and can efficiently set a second control channel in the primary cell and/or the secondary cell.

In the foregoing description, by way of example, but not limited thereto, in a case where the control information described in the first embodiment of the present invention is set and a second control channel is to be set for the secondary cell, control information for the primary cell is set by further adding the control information for the secondary cell described in the first embodiment of the present invention. That is, in order to set a second control channel for the primary cell and the secondary cell, control information for the respective cells may be set.

In the foregoing embodiments, by way of example, but not limited thereto, a resource element or a resource block is used as the unit of mapping a data channel, a control channel, a PDSCH, a PDCCH, and a reference signal, and a sub-frame or a radio frame is used as the unit of transmission in the time direction. Similar advantages can be achieved with the use of the domain composed of any desired frequency and time and the time unit instead of them. In the foregoing embodiments, the description has been given of, but not limited to, the case where demodulation is carried out using an RS subjected to a precoding process, and a port equivalent to the layer of MIMO is used as the port corresponding to the RS subjected to the precoding process. Similar advantages can be achieved by applying the present invention to ports corresponding to different reference signals. For example, in place of a Precoded RS, an Unprecoded RS may be used, and a port that is equivalent to a port or physical antenna (or a combination of physical antennas) that is equivalent to the output edge after the precoding process has been performed may be used as a port.

A program operating in the base station 101 and the terminal 102 according to the present invention is a program (a program for causing a computer to function) for controlling a CPU and so forth so as to implement the functions of the foregoing embodiments according to the present invention. Such information as handled by devices is temporarily accumulated in a RAM while processed, and is then stored in various ROMs and HDDs. The information is read by the CPU, if necessary, for modification/writing. A recording medium having the program stored therein may be any of semiconductor media (for example, a ROM, a non-volatile memory card, etc.), optical recording media (for example, a DVD, an MO, an MD, a CD, a BD, etc.), magnetic recording media (for example, a magnetic tape, a flexible disk, etc.), and so forth. Furthermore, in addition to the implementation of the functions of the embodiments described above by executing the loaded program, the functions of the present invention may be implemented by processing the program in cooperation with an operating system, any other application program, or the like in accordance with instructions of the program.

In a case where the program is distributed to be usable on market, the program may be stored in a transportable recording medium for distribution, or may be transferred to a server computer connected via a network such as the Internet. In this case, a storage device in the server computer is also encompassed in the present invention. In addition, part or the entirety of the base station 101 and the terminal 102 in the embodiments described above may be implemented as an LSI, which is typically an integrated circuit. The respective functional blocks of the base station 101 and the terminal 102 may be individually built into chips, or some or all of them may be integrated and built into a chip. The method for forming an integrated circuit is not limited to LSI, and may be implemented by a dedicated circuit or a general-purpose processor. In the case of the advent of integrated circuit technology replacing LSI due to the advancement of semiconductor technology, it is also possible to use an integrated circuit based on this technology.

While embodiments of this invention have been described in detail with reference to the drawings, a specific configuration is not limited to these embodiments, and the invention also includes design changes and the like without departing from the essence of this invention. In addition, a variety of changes can be made to the present invention within the scope defined by the claims, and embodiments that are achieved by appropriately combining respective technical means disclosed in different embodiments are also embraced within the technical scope of the present invention. Furthermore, a configuration in which the elements described in the foregoing embodiments and capable of achieving similar advantages are interchanged is also embraced within the technical scope of the present invention.

INDUSTRIAL APPLICABILITY

The present invention is suitable for use in a wireless base station device, a wireless terminal device, a radio communication system, and a radio communication method.

REFERENCE SIGNS LIST 101, 1401 base station, 102, 1402, 1403, 1504 terminal, 103, 1404, 1405, 1505, 1506 downlink, 201, 305 higher layer, 202 data channel generation unit, 203 terminal-specific reference signal multiplexing unit, 204 precoding unit, 205 cell-specific reference signal multiplexing unit, 206 transmit signal generation unit, 207 transmission unit, 301 reception unit, 302 reception signal processing unit, 303 control channel processing unit, 304 data channel processing unit, 1501 macro base station, 1502 RRH, 1503 line.

The invention claimed is:

1. A base station configured to communicate with a terminal in a cell, the base station comprising:
   a control information generator configured to generate control information for the terminal; and
   a transmitter configured
      to transmit a higher layer signaling including at least subframe pattern configuration information to configure subframes which the terminal shall monitor a second control channel, and
      to transmit the control information for the terminal on the second control channel in the subframes configured by the subframe pattern configuration information, the second control channel being transmitted using a second antenna port different from a first antenna port used for transmission of a first control channel, wherein
   the first antenna port is an antenna port used for transmission of a cell-specific reference signal that is a reference signal specific to the cell;
   the second antenna port is an antenna port used for transmission of a demodulation reference signal that is associated with the second control channel;
   a sequence for the demodulation reference signal is generated based on a cell ID and a scrambling ID;
   the cell ID is sent by the base station; and
   the scrambling ID is a pre-defined value.

2. The base station according to claim 1, wherein the demodulation reference signal is generated based on an orthogonal code corresponding to the second antenna port, and based on a pseudo-noise sequence generated based on identification information configured in the terminal through Radio Resource Control signaling.

3. The base station according to claim 1, wherein the second control channel is transmitted using the second antenna port, the second antenna port being defined in advance.

4. The base station according to claim 1, wherein the terminal is configured with monitoring of the second control channel individually on a cell-by-cell basis.

5. The base station according to claim 1, wherein
   the subframe pattern configuration information is a bit map with 40 bits which corresponds to 40 subframes, each bit of the bitmap indicating whether a corresponding subframe is configured to transmit the second control channel or not.

6. A base station configured to communicate with a terminal in a cell, the base station comprising:
- a control information generator configured to generate control information for the terminal; and
- a transmitter configured to transmit the control information for the terminal on a first control channel that is transmitted using a first antenna port or a second control channel that is transmitted using a second antenna port, wherein
- in a case where the terminal is not configured with monitoring of the second control channel, the control information for the terminal is transmitted on the first control channel;
- in a case where the terminal is configured with the monitoring of the second control channel, the transmitter is configured to transmit a higher layer signaling including at least subframe pattern configuration information to configure subframes which the terminal shall monitor the second control channel, and the control information for the terminal is transmitted on the first control channel or is transmitted on the second control channel in the subframes configured by the subframe pattern configuration information;
- the first antenna port is an antenna port used for transmission of a cell-specific reference signal that is a reference signal specific to the cell;
- the second antenna port is an antenna port used for transmission of a demodulation reference signal that is associated with the second control channel;
- a sequence for the demodulation reference signal is generated based on a cell ID and a scrambling ID;
- the cell ID is sent by the base station; and
- the scrambling ID is a pre-defined value.

7. A terminal configured to communicate with a base station in a cell, the terminal comprising:
- a receiver configured
  - to receive a higher layer signaling including at least subframe pattern configuration information to configure subframes which the terminal shall monitor a second control channel,
  - to monitor a control information for the terminal on the second control channel in the subframes configured by the subframe pattern configuration information, the second control channel being transmitted using a second antenna port different from a first antenna port used for transmission of a first control channel; and
- a control information processor configured to process control information for the terminal that is transmitted on the second control channel, wherein
- the first antenna port is an antenna port used for transmission of a cell-specific reference signal that is a reference signal specific to the cell;
- the second antenna port is an antenna port used for transmission of a demodulation reference signal that is associated with the second control channel;
- a sequence for the demodulation reference signal is generated based on a cell ID and a scrambling ID;
- the cell ID is sent by the base station; and
- the scrambling ID is a pre-defined value.

8. The terminal according to claim 7, wherein the demodulation reference signal is generated based on an orthogonal code corresponding to the second antenna port, and based on a pseudo-noise sequence generated based on identification information configured in the terminal through Radio Resource Control signaling.

9. The terminal according to claim 7, wherein the second control channel is transmitted using the second antenna port, the second antenna port being defined in advance.

10. The terminal according to claim 7, wherein the terminal is configured with monitoring of the second control channel individually on a cell-by-cell basis.

11. The terminal station according to claim 7, wherein
- the subframe pattern configuration information is a bit map with 40 bits which corresponds to 40 subframes, each bit of the bitmap indicating whether a corresponding subframe is configured to transmit the second control channel or not.

12. A terminal configured to communicate with a base station in a cell, the terminal comprising:
- a receiver configured to monitor a candidate of a first control channel or a candidate of a second control channel; and
- a control information processor configured to process control information for the terminal, the control information for the terminal being transmitted on the first control channel that is transmitted using a first antenna port or the second control channel that is transmitted using a second antenna port, wherein
- in a case where the terminal is not configured with monitoring of the second control channel, the receiver is configured to monitor the candidate of the first control channel, and the control information processor is configured to process the control information for the terminal;
- in a case where the terminal is configured with the monitoring of the second control channel, the receiver is configured to receive a higher layer signaling including at least subframe pattern configuration information to configure subframes which the terminal shall monitor the second control channel, to monitor the candidate of the first control channel, and to monitor the candidate of the second control channel in the subframes configured by the subframe pattern configuration information;
- the control information processor is configured to process the control information for the terminal;
- the first antenna port is an antenna port used for transmission of a cell-specific reference signal that is a reference signal specific to the cell;
- the second antenna port is an antenna port used for transmission of a demodulation reference signal that is associated with the second control channel;
- a sequence for the demodulation reference signal is generated based on a cell ID and a scrambling ID;
- the cell ID is sent by the base station; and
- the scrambling ID is a pre-defined value.

\* \* \* \* \*